United States Patent [19]

Bussard

[11] Patent Number: 5,160,695

[45] Date of Patent: Nov. 3, 1992

[54] METHOD AND APPARATUS FOR CREATING AND CONTROLLING NUCLEAR FUSION REACTIONS

[75] Inventor: Robert W. Bussard, Manassas, Va.
[73] Assignee: QED, Inc., Greenbelt, Md.
[21] Appl. No.: 476,044
[22] Filed: Feb. 8, 1990
[51] Int. Cl.$^5$ .............................................. G21B 1/00
[52] U.S. Cl. ..................................... 376/107; 376/145
[58] Field of Search ............... 376/145, 144, 107, 150, 376/120

[56] References Cited

U.S. PATENT DOCUMENTS

| | | | |
|---|---|---|---|
| 3,258,402 | 6/1966 | Farnsworth | 376/107 |
| 3,386,883 | 6/1968 | Farnsworth | 376/107 |
| 3,530,036 | 9/1970 | Hirsch | 376/107 |
| 3,530,497 | 9/1990 | Hirsch | 376/107 |
| 3,664,920 | 5/1972 | Hirsch | 376/107 |
| 3,715,595 | 2/1973 | Josephson | 376/145 |
| 3,779,864 | 12/1973 | Kaw et al. | 376/132 |
| 4,233,537 | 11/1980 | Limpaecher | 376/121 |
| 4,826,646 | 5/1989 | Bussard | 376/129 |

OTHER PUBLICATIONS

Nakamura et al. "Ion confinement by electrostatic potential well in magnetic multiple device", *A Physics Letter*, vol. 53A, No. 1, May 19, 1975, Amsterdam, NL, pp. 85-86.

Furth, "Prevalent Instability of Nonthermal Plasma", Phys. Fluids, vol. 6, No. 1, pp. 48-53 (Jan. 1963).

Hirsch, "Inertial-Electrostatic Confinement of Ionized Fusion Gases", Jour. Appl. Phys., vol. 38, No. 11, pp. 4522-4534 (Oct. 1967).

Elmore, et al., "On the Inertial-Electrostatic Confinement of a Plasma", Phys. Fluids, vol. 2, No. 3, pp. 239-246 (May-Jun. 1959).

Dolan, et al. "Electrostatic-Inertial Plasma Confinement", Jour. Appl. Phys., vol. 43, No. 4, pp. 1590-1600 (Apr. 1972).

Black, "Theory of potential well formation in an electrostatic confinement device", Jour. Appl. Phys., vol. 45, No. 6, pp. 2502-2511 (Jun. 1974).

Baxter, et al., "The effect of charge exchange on ion guns and an application to inertial-electrostatic confinement devices", Jour. Appl. Phys., vol. 53, No. 7, pp. 4597-4601 (Jul. 1982).

Dolan, "Electric-Magnetic Confinement", *Electrostatic and Electromagnetic Confinement of Plasmas and the Pheonomenology of Relativistic Electron Beams*, Marshall and Sahlin (eds), Proceedings of a Conference held Mar. 4-7, 1974, publ. as vol. 251 of the New York Acad. of Science, pp. 358-366, New York, 1975.

Stansfield, et al. "Progress Report on the Kemp II Experiment: Plasma Confinement in an Electrostatically Stoppered Spindle Cusp Magnetic Field, Electrostatic and Electromagnetic Confinement of Plasmas and the Phenonomenology of Relativistic Electron Beams", Marshall and Sahlin (eds), Proceedings of a Conference held Mar. 4-7 1974, publ. as vol. 251 of the New York Acad. of Science pp. 367-369, New York, 1975.

Lavrent'EV, "Electrostatic and Electromagnetic High-Temperature Plasma Traps", *Electrostatic and Electromagnetic Confinement of Plasmas and the Phenomenology of Relativistic Electron Beams*, Marshall and Sahlin (eds.), Proceedings of a Conference held Mar. 4-7 1974, publ. as vol. 251 of the New York Acad. of Science pp. 152-178, New York, 1975.

Verdeyen, et al., "Recent Developments in Electrostatic Confinement—Experimental", *Electrostatic and Electromagnetic Confinement of Plasmas and the Pheonomenology of Relativistic Electron Beams*, Marshall and Sahlin (eds.), Proceedings of a Conference held Mar. 4-7, 1974, publ. as vol. 251 of the New York Acad. of Science, pp. 126-138, New York, 1975.

Litton, et al., "Electron Beam Production from Perforated Wall Hollow Cathode Discharges", Proceedings of the 23rd Conference on Physical Electronics, pp. 185-194 (1963).

*Primary Examiner*—Daniel D. Wasil
*Attorney, Agent, or Firm*—Foley & Lardner

[57] ABSTRACT

An apparatus and method of enhancing nuclear fusion reactions utilizes a plasma, made up of ions and electrons, contained within a region, and enhances the density of the plasma using a collision-diffusion compressional enhancement process. Ion acoustic waves generated within a central region of the system permit increased reflection and scattering of ions and thereby reduces their mean free path within the core region to permit greatly increased ions density sufficient to enhance nuclear fusion reactions within the core.

51 Claims, 12 Drawing Sheets

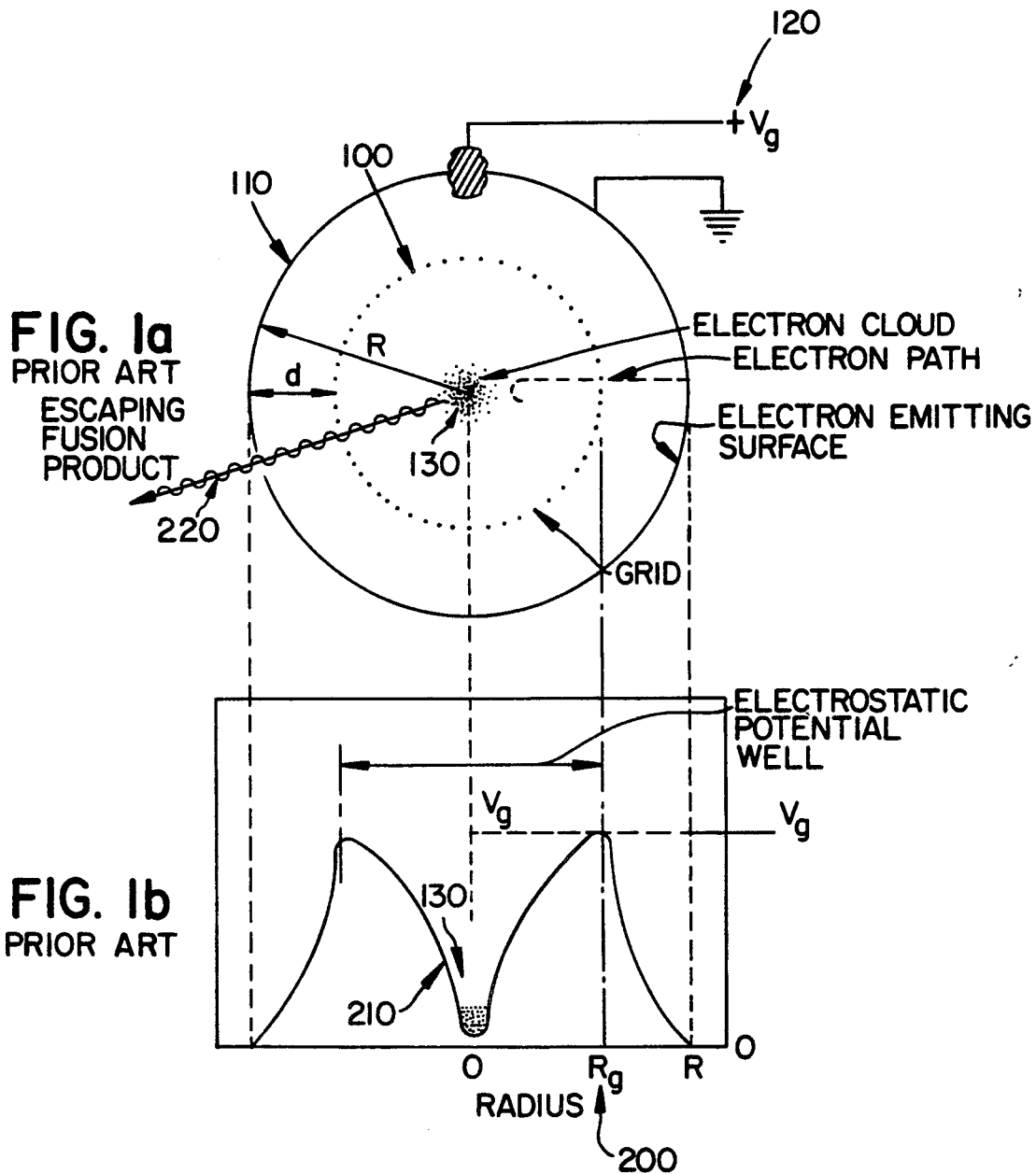

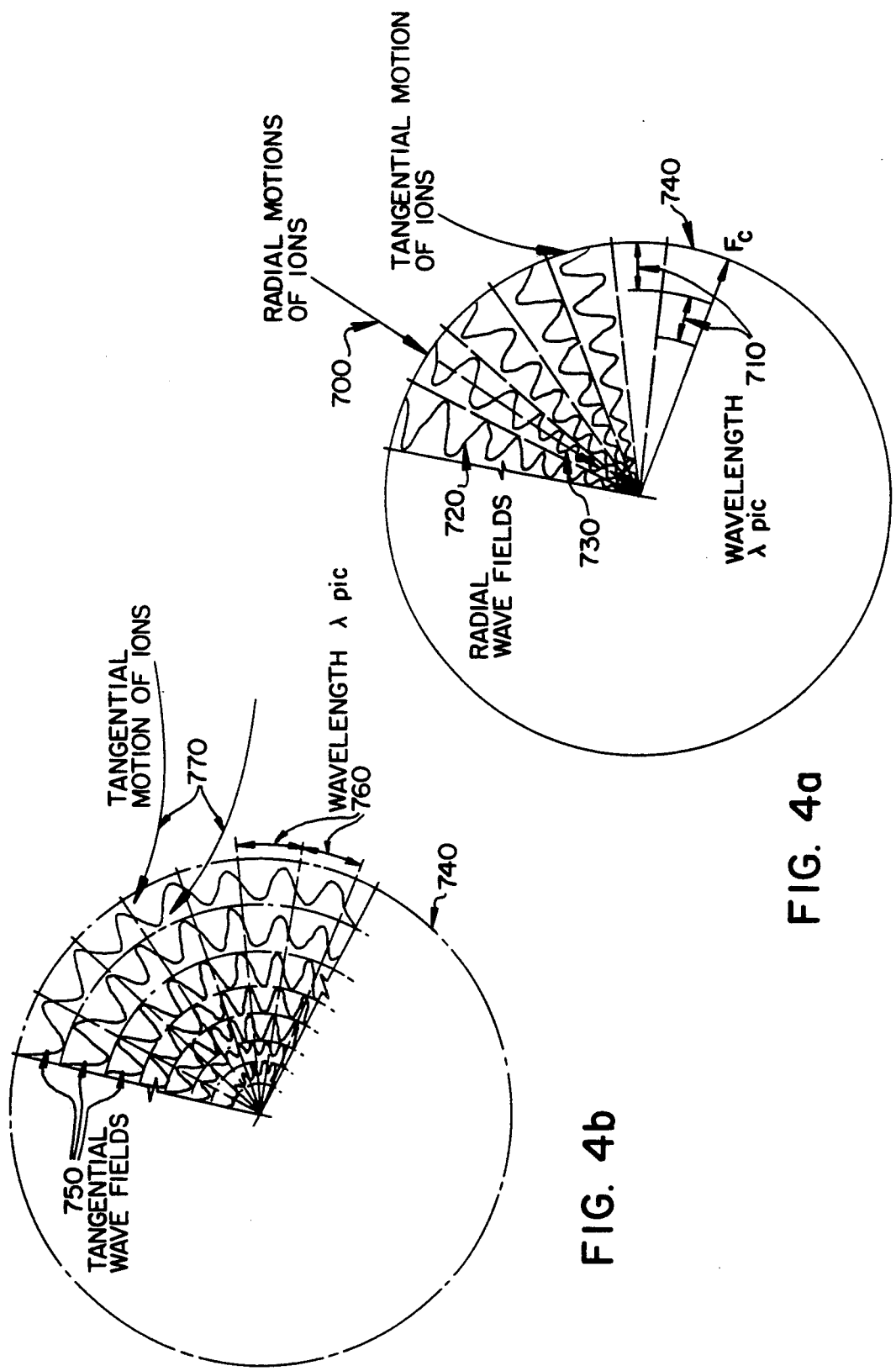

| LINE | 1 | 2 | | 3 | | | 4 | | 5 |
|---|---|---|---|---|---|---|---|---|---|
| $E_w$, (eV) | $2 \times 10^4$ | $2 \times 10^4$ | $5 \times 10^4$ | $2 \times 10^4$ | $5 \times 10^4$ | $10^5$ | $5 \times 10^4$ | $10^5$ | $10^5$ |
| $G_j$ | $10^4$ | $10^3$ | $10^4$ | $10^2$ | $10^3$ | $10^4$ | $10^2$ | $10^3$ | $10^2$ |

PARAMETER RANGES FOR INITIATION OF ICC EFFECT
IN DT FUSION FUELS

METHOD AND APPARATUS FOR CREATING AND CONTROLLING NUCLEAR FUSION REACTIONS

FIELD OF THE INVENTION

The invention pertains to a new physics process and method, and to associated apparatus for the creation of conditions under which nuclear fusion reactions can be made to occur and can be controlled, among charged particles capable of undergoing nuclear fusion. The invention thus involves two separate but related features: First is the conception of a new, unique and heretofore unrecognized set of physics processes that promote fusion reactions at high density among fusion fuel ions that are following converging spherical flow patterns, at operating conditions not previously thought to be capable of achieving or allowing such reactions or reaction densities, and; second, the conception of new and unique means of creating electric field structures for acceleration of such ions to achieve the necessary converging spherical flow. The general physics principles and conditions that are the subject of this invention can be applied with ANY means of accelerating fusion fuel ions, while the embodiments and conceptions of apparatus set forth in the preferred embodiments given here will apply most specifically to the acceleration of ions in a manner best and uniquely suited to exploit these physics processes.

BACKGROUND OF THE INVENTION

The central problem of creating useful controllable nuclear fusion reactions among ions is the necessity of confining a sufficient density of ions over a large enough volume of space, with high enough particle energy, to ensure that the reaction rate density between the ions is high enough to be interesting for both power generation and to overcome all radiative, collisional and other losses that may be associated with or inherent in the fact of the particles' confinement at high energy. Traditionally, two principal means have been examined to attempt the achievement of these conditions. These are "inertial" confinement and "magnetic" confinement.

The major means of attempting inertial confinement has been the use of intense beams of laser light, focussed on the surface material of spheres made of or containing fusion fuels, with sufficient strength to vaporize, heat and "blow off" surface material and thus to provide a radial compressive force on the sphere surface. This force then can act to accelerate the sphere surface inwards, compressing and heating the material contained therein. If of sufficient strength this could, in principle, cause particle densities and temperatures (energies) to become high enough that fusion reactions may occur. The principal difficulty in this approach has been the attainment of stability during compression over a large enough volume of material, in a short enough time, that radiation and electron conduction losses do not dominate and prevent the achievement of the requisite conditions for fusion. This approach has not proven feasible to date, and is not of further interest here.

Most of the world's fusion research efforts have been devoted to the magnetic confinement approach, in which strong magnetic fields are used to constrain the motion of fusion fuel ions (and electrons) along closed field lines in toroidal field geometries, for example, or along open field lines with large internal magnetic reflection characteristics, as in double-ended "cusp" mirror or solenoidal magnetic "bottle" confinement schemes. In these approaches, the forces acting to "contain" or "confine" the fusion fuel ions are always due to the interaction of their motion with the externally-imposed magnetic fields, and are thus principally at right angles to the direction of the particle motion, rather than oppositely-directed, as would be desireable for action against the particle motion. These magnetic approaches thus suffer from use of an indirect and therefore inefficient means of constraining ion loss motion towards the confining walls of the system.

A more detailed discussion and summary of these and other related approaches to magnetic and non-electric inertial confinement of fusion fuel ions, and references to other writings on this topic is given by R. W. Bussard[1] in U.S. Pat. No. 4,826,646, incorporated herein by reference, in connection with a description of an alternative electric inertial means of plasma confinement. This writing also describes the principal loss mechanisms confronting these "conventional" concepts for plasma confinement, and the general nature of the characteristics and limitations of these approaches.

In the above patent it is shown that conventional magnetic confinement approaches to fusion power generation are practically unable to take advantage of the large energy gains (G = ratio of energy output to energy input per fusion reaction) naturally found in the fusion reactions between various reactive isotopes of the light elements These gains can be as large as $G \approx 1000$–$2000$ for the fusion of deuterium (D or $^2$H) with tritium (T or $^3$H), the two heavy isotopes of hydrogen (p or $^1$H), according to $D+T \rightarrow {}^4He+{}^0n$ (+17.6 MeV), or up to $G \approx 50$–$100$ for fusion between hydrogen (p) and boron-11 ($^{11}$B), $p+{}^{11}B \rightarrow 3\ {}^4He$ (+8.6 MeV). In spite of this, it is found that the large power requirements for confinement and plasma heating in magnetic confinement approaches place practical engineering limits on the energy gain potentially achievable to $2<G<5$.

Because of the difficulties inherent in the non-electric inertial and magnetic means for confining ions, some researchers turned to the use of more direct means of providing energy and motion to fusion fuels, by use of electric fields for their acceleration, and to spherically-convergent geometries for their densification by such motion. The simplest such system is that with pure spherical goemetry, in which a negative potential $(-E_w)$ is maintained at the center of a spherical shell by an electrode (cathode) mounted at the center. Positive ions introduced into this system will "fall down" the radial electric field toward the center, gaining energy and speed with nearly 100% efficiency in the process. In principle, this enables the achievement of large gain (G) from fusion reactions due to collisions at the system center.

If the ions are moving on purely radial paths, they will stop only when the force of electrostatic repulsion between them is sufficient to overcome the kinetic energy gained in their fall "down" the potential well. The radius ($r_{coul}$) at which this will occur is very small for particles that have gained energy from potential wells with energy depths and densities of interest for fusion (e.g. for $E_w \approx 100$ keV, $r_{coul} \leq$ 1E-5 cm), and a consequent large increase in density with decreasing radius will result from the geometric radius-squared variation of area in the converging ion flow.

However, a neutral (or near-neutral) plasma can not be confined by a static electric field of this type, because of charge separation and the resulting production of local dielectric fields that cancel the otherwise confining electrostatic field (Earnshaw's Theorem). Thus, the ion density that can be reached by this means is too small for fusion reactions at useful power levels. This difficulty can be overcome, and large ion densities achieved in plasmas of electrons and ions that are NOT locally neutral, by the use of inertial forces (particle kinetic energy) to create the confining field in a mixture of ions and electrons.

One of the earliest such concepts was studied by Elmore, Tuck and Watson[2], in 1959, who proposed to overcome the Earnshaw's Theorem limits (above) by injection of energetic electrons radially inward to the center of a spherical volume through a spherical shell screen grid system, as indicated in FIG. 1a. The grid 100 is to be held at a high positive potential relative to an electron-emitting outer surface shell 110 surrounding the grid, so electrons are injected into the interior grid space with the energy of the potential difference 120 between the grid and the outer shell. Electrons thus injected will converge to a central region 130 where their electrostatic potential at the sphere center is approximately equal to the grid injection energy. FIG. 1b shows the potential distribution in such a device.

This large negative potential is then used to "trap" ions "dropped" into the well at the position of the electron injection grid 200, for ions so trapped will oscillate back and forth across the well at radius 200 (Rg) until central collisions result in fusion reactions, whose products 220 are sufficiently energetic to escape the well boundary, and deliver energy outside the well system. Non-reactive central collisions (i.e. scattering collisions) will not cause significant particle losses because they take place at the device center, where the only effect is to redirect the momentum vector of the colliding particles to new radial directions (assuming that the system is arranged so that central collisions have coincident center-of-mass and center-of-lab frames).

The system they studied was unpromising, however, because no means were provided to inhibit the loss of electrons from the sphere outer surface, and because the model for radial energy distribution of the electrons was such (Maxwellian) that very inefficient well formation was inherent in the system concept. These two defects led to greatly excessive electron power losses, such that net power production by fusion was a practical impossibility in this system. In addition both Elmore, Tuck and Watson[2], and Furth[3] showed that the confinement would be unstable at ion densities of interest for fusion power; thus ion confinement by electron injection in purely inertial-electrostatic wells, with the energy distributions assumed in these studies, is not a useful approach to the attainment of fusion power.

The limitations of electron injection were overcome by Farnsworth[4] and Hirsch[5], working with Farnsworth, who used ion injection rather than electron injection for the establishment of initial conditions for the formation of ion-trapping potential wells. The several-thousand-fold mass difference between these two species of charged particles allowed the attainment of much more stable field/ion-distribution structures than predicted for initial well formation by electron injection alone.

As shown in FIG. 2a, Hirsch and Farnsworth proposed to use the (radial) injection of (heavy) ions at well depth energies (hundreds of keV) to form a spherically-symmetric virtual anode region 300 within the injection volume, which would then attract electrons from an electron-emitting grid screen 310 located outside this volume, to fall radially through the ionic virtual anode and form a spherically-symmetric interior virtual cathode 320 which then, in turn, would accelerate the ions further to convergence at the system center 330.

In actual fact, however, their experiments utilized ion injection from six symmetrically-arranged ion "guns" 400 located in a cubical array around the surface of a sphere 410 which contained a screen grid 420 for electron emission (as described by Hirsch in two patents on the subject[6]), as shown in FIGS. 2b and 2c. These experiments achieved continuous fusion reaction rates of about 1E10 reactions/second, where EX designates 10 raised to the power X. The models used by Hirsch[5] could not explain these high reaction rates (see e.g. Dolan et al[7]), and it was suspected that intersecting and colliding beam phenomena associated with the use of the tightly-focussed, opposing ion guns led to dominant phenomena different from those of the concentric, nested virtual electrode structures hypothesized by Hirsch/Farnsworth[4,5] in their original descriptions of the concept.

Theoretical models of electron and ion circulation and of associated potential well shape were examined by Black[8], who showed that the hypothesized virtual electrode structures would not occur in ion/electron flows which had any finite angular (i.e. transverse) momentum in their motion across the potential well. A later study by Baxter and Stuart[9] of the Hirsch/Farnsworth experiments emphasized the role played by multiple (ca.7-10) transits of ions across the well due to the reflection of ions by grid structures from opposing ion guns used in the experiments, but still remained inconclusive as to an explanation for the anomalously large observed fusion neutron production rates.

In order to attain net power production (i.e. high gain, G) from fusion reactions induced by collisions at the center of such systems, Farnsworth, Hirsch and Bussard all showed that the electron current circulating across the system, and through the electron grid (virtual cathode) region, must reach very large values, equivalent to electron current recirculation ratios $(G_j)$ of $G_j \approx$ 1E5 to 1E6 (circulating vs. injected electron current). The corollary ion flow recirculation ratio $(G_i)$ required was also shown to be in the range of $G_i \approx$ 1E3 to 1E4, for the production of net fusion power. It is evident that these values can be attained only if electrons and/or ions are not removed by collisions with structure (e.g. grids) and/or walls of the system.

But in the Hirsch/Farnsworth approach, as in the concept of Elmore, et al above, the existence of grid structure of significant solidity in the path of the circulating particle flows will always prevent the buildup of these large circulating currents needed to obtain large system power gain (G) values. Thus an inherent limitation of the Hirsch/Farnsworth approach is due to the ion gun structures required for ion injection, and of associated electron-emitting grid structures to provide the gross charge neutralization required to allow buildup of large ion currents and of large densities of both ions and electrons in recirculating electron and ion flow, as needed for large system gain. The very components required for supply of particles to the system thus prevent the attainment of the high recirculating densities required for large power output.

This defect was recognized by Hirsch[10], who tried to find a way to reduce structure-collision losses of electrons circulating through the system, by passing currents through the screen/grid wires or rods so as to provide "magnetic insulation" around them sufficient to prevent electrons from striking them as the electrons passed back and forth through the screen grid region. This did not appear to be promising, as proposed, for it introduced more complexity into the system structure and increased power requirements, without providing enough insulation to solve the structure-collision-loss problem. In addition, it introduced transverse momentum to the particle current streams, which further reduced their ability to converge towards a point by radial motion. Other work using electron injection to enhance magnetic confinement schemes was conducted by several researchers[11], but is not relevant here.

In reference to FIGS. 3a and 3b, a solution to most of these problems was given by Bussard[1,12] who proposed a concept for a magnetically-confined, electron-injection-driven, negative potential well, which confines ions 520 injected at low energy by injectors 530 on the field axes, principally by inertial-electrostatic fields set up by high-energy electrons 540, supplied by electron guns 510, and confines these electrons without structure-collisions by use of special polyhedral point-cusp quasi-spherical magnetic fields 500 around the system outer surface. FIG. 3a shows a cross-section of the polyhedral system of FIG. 3b, taken on the plane X—X. A detailed study of this concept[13] shows that such a system can work, and that high gain values (and their requisite large electron current recirculation ratios, $G_j \approx 1E5-1E6$) can be obtained if special polyhedral surface magnetic fields of sufficient strength (e.g. 2-20 kGauss) are arranged around the system.

This concept and study was based on a general assumption of spherical convergence in ion and electron flow, with the ion motion at high convergence 610 dominated by ion transverse momentum content, and the electron motion inside a certain radius (the virtual cathode radius) dominated by the ion motion (the heavier ions pull the lighter electrons along, to avoid excessive positive charge buildup). Ion density increase with radial convergent motion under these conditions was taken to be varying approximately as $1/r^2$ to $1/r^3$, down to a (small) critical radius ($r_c$) 620 at which ion radial motion had ceased, and all ion motion was then transverse and isotropic in a spherical surface sheet at that radius. This radius was shown to be determined by the average transverse momentum content of the ions at the system surface, after reaching steady-state from multiple traversals of the core, as compared with their radial momentum content at maximum radial speed (at well bottom). The ratio of critical radius to system radius (R) is then given by $<r_c> = (r_c/R) = (E_t/E_r)^{0.5}$, where $E_t$ and $E_r$ are mean transverse energy at the surface, and radial energy near the bottom of the potential well, respectively. System stability was assured by the large recirculating power flow, and by the existence of the externally-supplied polyhedral magnetic fields.

However, the limited density increase possible under these convergence scaling laws and conditions leads to requirements for large electron current recirculation ratios ($G_j > 1E5$) which, in turn, require large quasi-spherical polyhedral surface fields 500 for electron confinement. Generation of these fields requires relatively large currents in the polyhedral windings 600 that define the magnet coil systems, and these lead to large ohmic power losses for use of normal conductors for the magnet coils. For use of DT fuels the losses are estimated as typically >20-30 Mwe for systems with reasonable gain (G), while use of advanced fuels such as $p^{11}B$ may require magnet coil power of >60-100 Mwe for systems with minimally useful net gain.

SUMMARY OF THE INVENTION

Considering all of these difficulties and design limitations it appears that useful confinement and enhanced increase in density of ions can be achieved by an improvement on all prior concepts, by use of unique physics phenomena initiated and maintained by inertial forces on the confined ions, these in turn supplied by new and unique electrode means, or by other more conventional means of accelerating charged particles. The current invention accomplishes this by:

(1) Using a substantially spherical electrostatic field geometry for acceleration of ions in radial motion, to yield a spherically-convergent circulating flow system for these ions, allowing their densification towards the center of the sphere, with consequent attraction of electrons both within and without the internal spherical region, which electrons act to partially neutralize the positive ionic charge and permit the attainment of high densities of ions due to the presence of the electrons thus attracted. This requires use of an electric field geometry which is everywhere spherical with respect to the system center towards which the ion densification occurs, and which does NOT have associated magnetic fields that can produce non-radial motion by interaction of the flowing particles with such fields.

(2) Accelerating ions along radial lines towards the center of such a spherical volume at a speed and with such a flux density that conditions for initiation and maintenance of ion acoustic waves are created at small radius, with particle densities and energies such that the ion acoustic wavelength is small compared to the radius at which this initiation occurs, and with flow and velocity conditions such that the rate of change of ion acoustic wavelength with change in radial position of ions in the converging flow is simply directly proportional to the radial position, itself, thus ensuring resonance coupling of ion flow with these waves in a radial direction or mode within the sphere.

(3) Accelerating ions as described in (2), above, in a system with ion flow and density conditions chosen so that the ion acoustic wavelength is (nearly) an exact integer divisor of the circumference of the sphere at the core radial position at which the onset of ion acoustic waves is made to occur, thus ensuring resonance coupling of ion flow with these waves in an azimuthal-tangential direction or mode around the sphere.

(4) Using the resonant coupling of ion motion with ion acoustic waves thus formed in either radial and/or azimuthal-tangential modes, by operation at the special conditions required for their initiation as described above, to cause ion/wave collisional interactions on the scale of ion acoustic wavelengths within the small core radius; these short-range collisions then acting to trap and confine ions by collisional diffusion processes within the core, resulting in the buildup of very large ion densities within this core—very much larger (up to thousands of times) than otherwise possible by conventional simple Coulomb collisional interactions of ions with other ions in flow across the small radius of the resonant acoustic central spherical region.

(5) Operating with sufficiently large spherically-convergent ion current, accelerating voltage (ion energy) and current density (particle flux) conditions such that the ion acoustic initiation radius referred to above is large enough that the number of ions contained therein will yield significant fusion reaction rates and power generation in excess of that required to accelerate the ions, make up for losses, and otherwise drive the system.

(6) Providing electrons to the interior region of the sphere, by collisions with neutral gas within the spherical region, or by electron injection into this region or by emission from electron emitters placed spherically around it or from point/needle/button emitters on such spherical surface, so as to neutralize the buildup of positive charge density resulting from ion densification by convergence towards the center, and thus to allow a larger total number of ions to be focussed in the flow without significant ion energy losses due to repulsion from the creation of a strong positive virtual anode.

(7) Adding ions to the system by direct injection of energetic ions and/or (indirectly) by addition of neutral gas to the ion injection region, which is then ionized by collisions with electrons or ions moving through the system, to attain ion densities needed for useful nuclear fusion reaction rates, and to make up for ions consumed by such reaction processes.

(8) Using a concentric electrode array with minimum losses due to collisions with circulating particles, by use of wire frame electrodes arranged so as to form approximately equal areas on a spherical surface surrounding the central region of confined circulating ions, or by use of point "button" electrodes, arranged equispaced on a spherical surface around the system center, both arranged so as to provide spherical electrostatic potential surfaces around the center when energized by a source of potential difference, and configured so as to avoid the generation of any magnetic fields by currents through them.

(9) Accelerating ions inward through such a potential difference, by causing them to appear (or be created) in the space between two concentric accelerating electrode surfaces, from collisional ionization with electrons accelerated in a direction away from the system center, which space is also the region in which ions or neutral particles may be added to the system, as in (7), above.

(10) Using an external set of concentric electrodes, or a single electrode inside of and concentric to an external spherical shell wall bounding the system, located outside the ion accelerating electrodes, to provide an electric field of opposite sense to that required for inward acceleration of the ions, to decelerate electrons otherwise driven out of the system by the interior ion accelerating field, and thus to prevent their loss; or to use any other external means of preventing electron collisions with system structure and/or walls or of electron escape from the system of charged particles.

It is the object of this invention to overcome limitations and deficiencies of previous concepts for electrostatic confinement of ions by increasing the density of ions in the central core, very greatly beyond that expected from the conventional spherical flow convergence and densification that characterizes the several prior concepts for electrostatic confinement of Elmore et al, Farnsworth/Hirsch, and Bussard.

It is further the object of this invention to accomplish this great increase in density by utilizing unique physics effects created by operation of spherical converging ion flows in special ion acoustic resonant oscillation conditions over a dense central core, under which ions are trapped and the ion density is enhanced by internal collisional-diffusion processes, to achieve densities of such confined ions at values large enough to yield nuclear fusion reactions at useful rates.

It is further the object of this invention to utilize these means for the confinement and densification in a collisional-diffusion enhanced core of energetic ions of a variety of types capable of undergoing fusion reactions, at particle energies in the range of 2-5 keV up to 400-600 keV, and to use these dense core ions for the generation of fusion power therein.

It is further the object of this invention to arrange the electrodes for acceleration of ions into the spherical core region so that these intercept a minimum fraction of the ions which must pass through them in recirculating flow, and thus to keep ion/structure collision losses as low as possible, so that the number of ion transits across the system required for fusion reaction power generation in excess of losses is very much less than in previous concepts for electrostatic confinement.

Any mechanism that can be used to achieve a great increase of central ion density in spherically-convergent ion flows in electrostatic confinement concepts for fusion power, will greatly reduce and may eliminate the need for large particle recirculation ratios. The present invention is such an improvement on all prior concepts, by use of a new and unique set of physics mechanisms governing interparticle collision phenomena within the small dense central core region of spherical inertial colliding flow systems, such that ion density therein may be enhanced by several thousand-fold (or more) above densities attainable in previous systems. This is here called the Inertial Collisional Compression (ICC) effect. Such increases, in turn, lead to increases in fusion reaction rates of up to several million-fold (varies as square of the density), with consequent reduction of the need to contain the charge-neutralizing electrons for many recirculating trips across the potential well in the system. In consequence, devices that use this new principle of inertial collisional compression (ICC) may be able to be constructed of quite simple electrode grids, without any of the complex or deleterious structures required for previous concepts of inertial-electrostatic confinement.

BRIEF DESCRIPTION OF THE DRAWINGS

The invention may be understood in reference to the preferred embodiments taken in conjunction with the drawings wherein:

FIGS. 1a and 1b illustrate a known negative electrostatic well apparatus and its electric potential distribution respectively;

FIG. 4a shows the interaction of radial ion kinetic energy with radial electric fields in an S-wave mode of operation of ion acoustic waves in accordance with the invention;

FIG. 4b shows the interaction of tangential ion kinetic energy with tangential electric fields in a T-wave mode of operation of ion acoustic waves in accordance with the invention;

DETAILED DESCRIPTION OF THE PREFERRED EMBODIMENTS

Figure 2A:
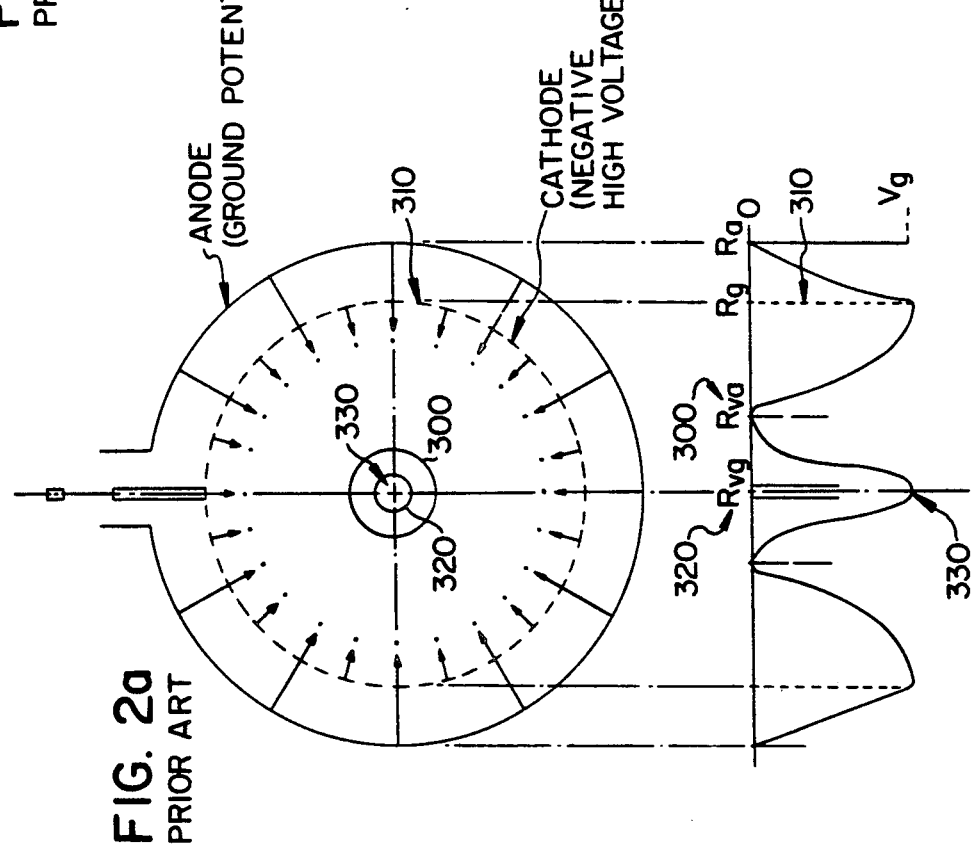
FIGS. 2a, 2b and 2c illustrate a known Hirsch/Farnsworth apparatus for ion injection.
Figure 2C:
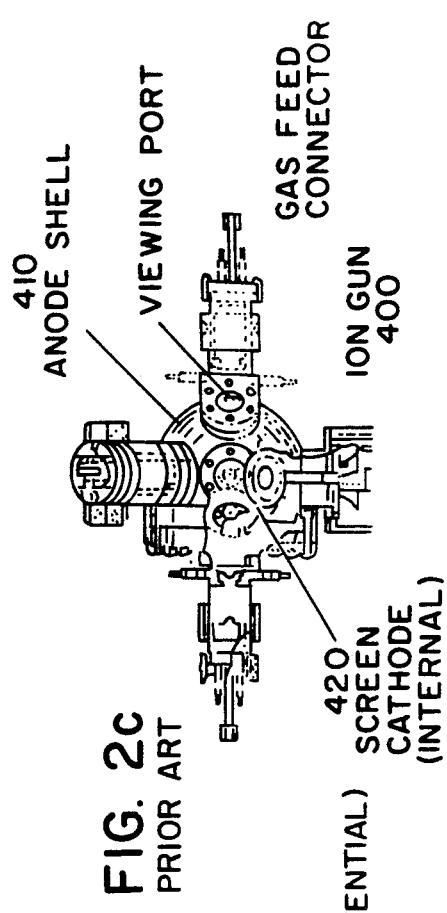
Figure 2B:
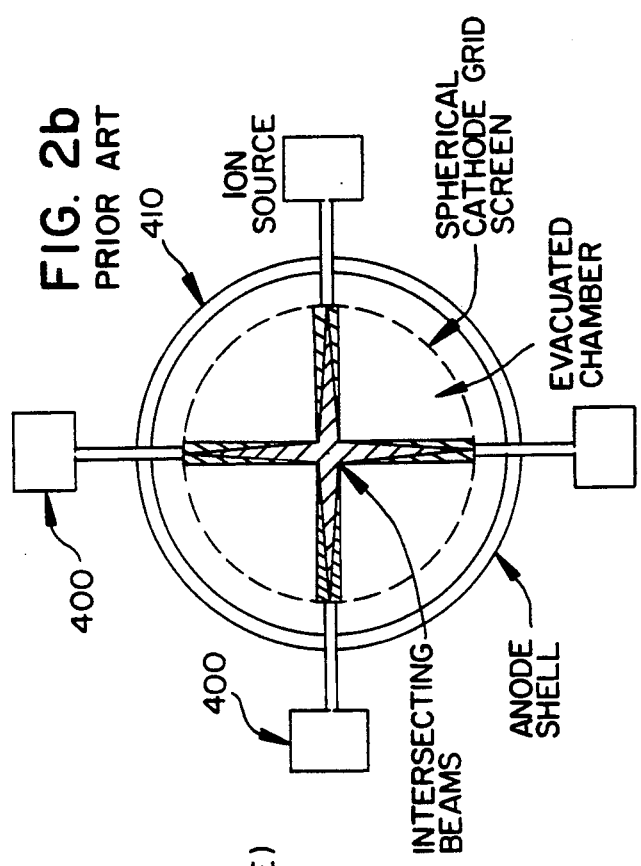
Figure 3A:
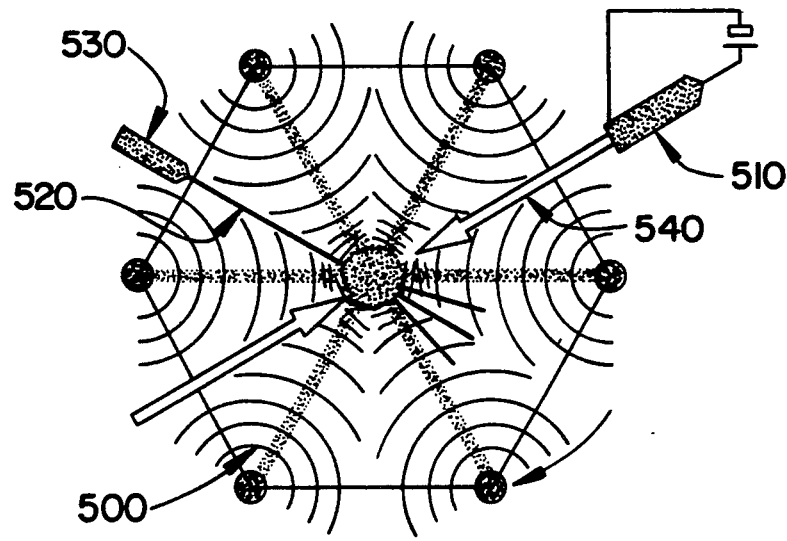
FIGS. 3a and 3b illustrate a known Bussard apparatus using polyhedral point-cusp quasi-spherical magnetic fields to confine ions and electrons in accordance with U.S. Pat. No. 4,826,646.
Figure 3B:
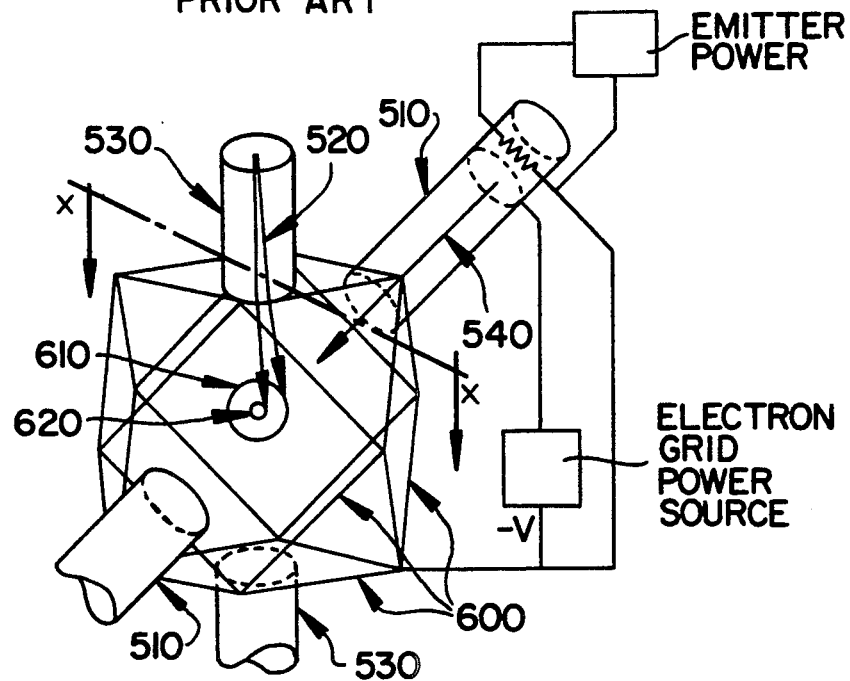

The current invention of apparatus is based on the use of the ICC effect, which can be created or reached only by operation at or above a certain set of conditions of the primary ion flow system. The invention of the ICC effect, itself, is derived from a new understanding of the dynamics of ion flow and interaction in the flow regime around the central core of a converging colliding-flow system. Its principles will work as well for cylindrical converging flow as for spherical flows, but attention here is limited to the spherical case, as this will always yield the largest degree of density increase and the most favorable conditions for the attainment of fusion reactions of interest for power generation. Finally, the ICC effect can be attained in ANY system of spherical converging flow of charged particles or of an ion/electron mixture, in which the ions are injected or caused to move radially inward at high energies (e.g. at energies >1 keV) by some means, whether this is achieved by the use of ion guns (as in the method of Hirsch/Farnsworth[4,6]), or by electric grids (as by inversion of the electric fields from those of Elmore et al[2]), or by acceleration by virtual cathodes (as from well formation by electron injection, as in the method of Bussard[1]).

The attainment of the desired ICC method of operation requires that conditions for ion acoustic oscillations be achieved at small radius in the core, where the ion density increases naturally due to geometric convergence of the cross-cavity flow of ions through the spherical system. In the normal flow of ions with non-zero transverse (or angular) momentum in such a system, conservation of total momentum and total energy of the ions results in increasing deviation from purely radial motion as the ions move to smaller radii. At some finite radius, the ion radial velocity ($v_r$) will reach zero, and the ion will orbit around the center and proceed out the other side of the system, if no resonant oscillatory effects (of the type of interest here) are present. The only deviation from single particle motion will result from Coulomb collisions with other ions similarly orbiting past the core region. In order that these be sufficient to create useful fusion reaction rates it has been shown[1] that ion flow recirculation through the core must be the order of 1E3 to 1E4 times the ion injection current, and corresponding electron recirculation ratios must be in the range of 1E5 to 1E6.

With the ICC method, these recirculation ratios may be greatly reduced, typically to values of one-hundredth to one-ten-thousandth of those required for useful operation without the ICC effect. This is a result of the unique compaction of ion density that occurs in the central core of the system when the conditions for initiation of the ICC effect are obtained.

For initiation of resonant coupling of ion flow motion with radial ion acoustic waves (here called "S" waves), and thus with other ions resonantly coupled with (or trapped in) such waves, these conditions require that the rate of change of mean free path for ion acoustic wave/particle collisions be small over one wavelength in the radial direction. For resonance with azimuthal-tangential (transverse) motion (here called "T" waves) it is necessary that the fractional rate of change of ion/wave collisional mean free path be equal to the fractional rate of change of radial position of the ions trapped within the collisiondiffusion core set up by these wave structures.

The collision mean free path ($\lambda_{pi}$) will be the distance traveled by an ion at maximum speed ($v_i$) in the core region over one cycle of oscillation at ion acoustic wave frequency ($f_{pi}$), thus $\lambda_{pi} = (v_i / f_{pi})$. Pure ion/ion oscillations can occur in regions where the ion density exceeds the electron density. Since this will frequently be the case in the core boundary of such converging spherical ion flows, oscillations of this type will appear at the ion/ion acoustic wave frequency and ion particle speed of $$v_i = (2E_w/m_i)^{0.5} \text{ and } f_{ii} = (n_i Z^2 e^2 / \pi m_i)^{0.5} \quad (1)$$

In addition, hybrid ion/electron oscillations will occur in the core and at the core boundary, where electron radial speeds are comparable to ion speeds. These ion/electron oscillations, also called ion-acoustic waves, will occur at a modified electron plasma frequency, $f_{ie}$ of $$f_{ie} = (n_i Z^2 e^2 / \pi m_e)^{0.5} = f_{ii}(m_i/m_e)^{0.5} \quad (2)$$

Defining $a_{ij} = 1$ for ion/ion waves and $a_{ij} = (m_e/m_i)^{0.5}$ for ion/electron waves, allows both of these ion-acoustic oscillation frequencies to be written simply as $f_{pi} = f_{ii}/a_{ij}$. Here $E_w$ is the energy of ions in the core region, $m_e$ is electron mass, $m_i$ is the ion mass, $n_i$ is ion particle density, and Z is the ionic charge in units of the electronic charge e, given by e=4.8E-10 cgs units (statcoulombs). Using these, the ion/wave collision mean free path at the core surface can be written as $$\begin{aligned}\lambda_{pic} &= (a_{ij})(2E_w \pi / Z^2 e^2 n_c)^{0.5} \\ &= 0.66E4(a_{ij})(E_w/Z^2 n_c)^{0.5}\end{aligned} \quad (3)$$

where the ion density at the collisional core boundary has been written as $n_c$, and the numeric form is for $E_w$ in eV and $n_c$ in ions/cm$^3$. Now, the conditions for coherency of resonant oscillation (described above) are just $$(d\lambda_{pi}/dr)_c << 1 \quad (4a)$$

for S-wave radial resonant coupling, and $$(dLN\lambda_{pi}/dLNr)_c = 1 \quad (4b)$$

for T-wave azimuthal-tangential coupling where LN denotes the natural logarithm (log to the base $e=2.71828$), and the expressions are to be evaluated at the boundary ($r_c$) of the acoustic wave core, within which the particles are constrained in their motion by collision diffusion processes between wave-trapped ions with each other and with the resonantly-driven ion acoustic waves. In addition, a fundamental requirement for existence of any ion acoustic waves within the core boundary is simply that the mean free path be less than the boundary radius, thus $(\lambda_{pi})_c < r_c$, which gives equivalent conditions to those of Eq. (3), above.

Applying these to the functional forms given above for the mean free path gives the conditions for ion-/wave coherency and oscillation-initiation in terms of the ion energy, charge state, core boundary density, and radius of the acoustic wave core boundary. The minimal condition for acoustic S-wave initiation requires that the ion density be $$n_c > (2\pi E_w/Z^2 e^2 r_c^2)(a_{ij}) \quad (5)$$

at the core boundary. Indeed, this condition determines whether or not and where such a boundary will be (i.e. at what $r_c$ it will be found, given other parameters). With this it is possible to determine the minimum input ion injection power ($P_{inj}$) required to produce the desired ICC condition. The total power is just the injected surface ion current density ($j_{io}$) taken over the injection surface at radius (R), and the ion energy ($E_w$).

For purposes of comparison, it is convenient to write this in terms of an equivalent electron injection power, based on an injection surface electron density ($n_{eo}$) with current density ($j_{eo} = n_{eo} v_{eo}$), where $v_{eo}$ is electron velocity at energy $E_w$. The injection ion density at this surface is less than the electron density by the factor $G_j$, the electron recirculation ratio. Thus the injection power can be written as $P_{inj} = 4\pi R^2 (E_w v_{eo} n_{io}/k_s G_j)$, where the power is in watts for $E_w$ in eV, and $k_s = 6.28E18$ charges/sec per amp of current. In order to use this in the S-wave criterion of Eq. (5), it is necessary to write the surface ion density in terms of ion density in the core region. This can be done by use of the ($1/r^2$) geometric scaling of spherically convergent flow, $n_{io} = n_c(r_c/R)^2$. With this the S-wave condition leads to a minimum requirement on injection power for resonant wave initiation as $$P_{inj} \geq (a_{ij})(2\pi E_w k_e/Z^2 e^2)^* (4\pi E_w/G_j k_s)$$
$$(2E_w k_e/m_e)^{0.5} \text{ (watts)} \quad (6)$$

for $E_w$ in eV. Here m is electron mass in gm, and $k_e$ is a conversion constant for energy ($k_e = 1.6E-12$ erg/eV), and other parameters are as before. Reducing this numerically gives $$P_{inj} \geq 5.21E-3(a_{ij})(E_w^{2.5}/Z^2 G_j) \text{ (watts)} \quad (7)$$

which is independent of the core radius, $r_c$. Thus, S-waves can be initiated at any core radius at which it is possible to do so, if sufficient driving power is supplied to the system.

Note that the electron recirculation ratio ($G_j$) is related to the ion recirculation ratio ($G_i$) for ion-injection-driven systems simply by the square root of the ratio of ion to electron mass; i.e. $G_i = G_j(m_e/m_i) = G_j(a_{ij})$. Typically, ion current recirculation ratios will be less than electron ratios by a factor of the order of 70-100.

As an example, for the mode $a_{ij}=1$, if $G_j=1E4$ (so that typically $G_i \approx 100$-130), $Z^2=2$, and $E_w = 1E4$ eV, the injection power required would be only $P_{inj}=2.6$ kwe. At $E_w=1E5$ eV, this becomes $P_{inj}=82.2$ kwe. And, if $G_j=1E3$, $G_i \approx 10$-13, the power levels would be only ten-fold higher. These power levels are all very much smaller than those required to drive ion- or electron-driven spherically convergent flow systems without the ICC process.

In reference to FIG. 4a, these S-waves involve exchange of energy between ion radial kinetic energy 700 (whether or not ion motion is purely radial or is partially tangential) and radial wave electric fields 720 ($E_r$), resulting from and associated with the ion acoustic wave fields, with wavelength $\lambda_{pic}$ 710. Such oscillations 720 are shown in FIG. 4a along the radial path of an ion 730 inside the critical core radius $r_c$ 740.

Figure 5B:
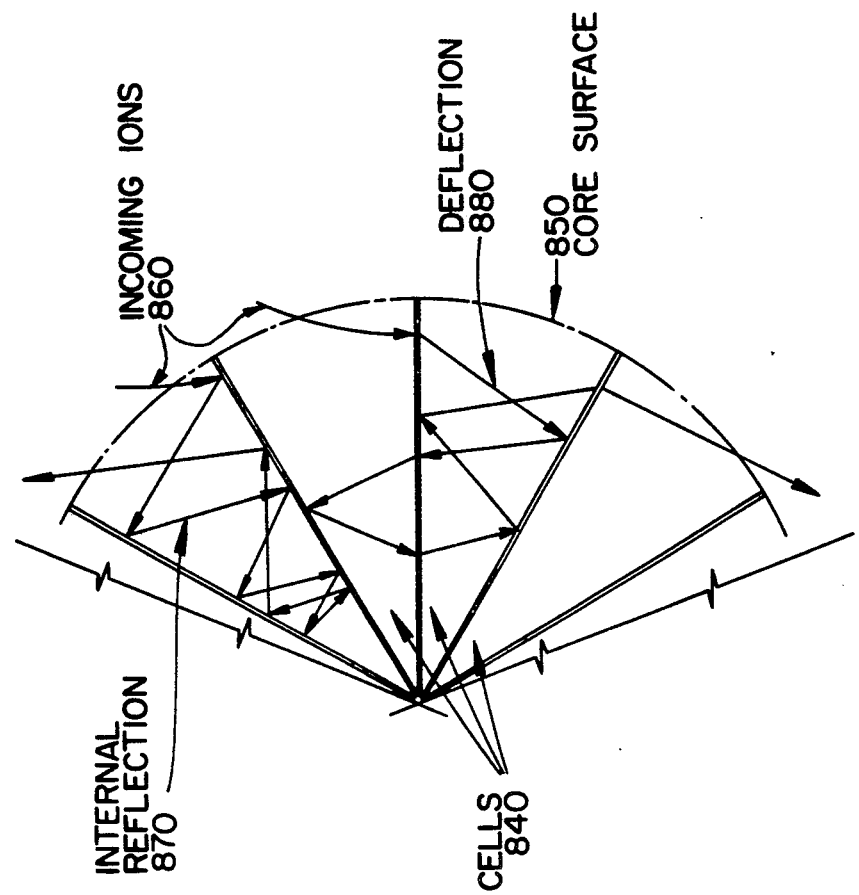
FIGS. 5a and 5b illustrate quasi-hexagonal-conical cellular repetitive structures supporting T-wave ion acoustic wave operation in accordance with the invention.
Figure 5A:
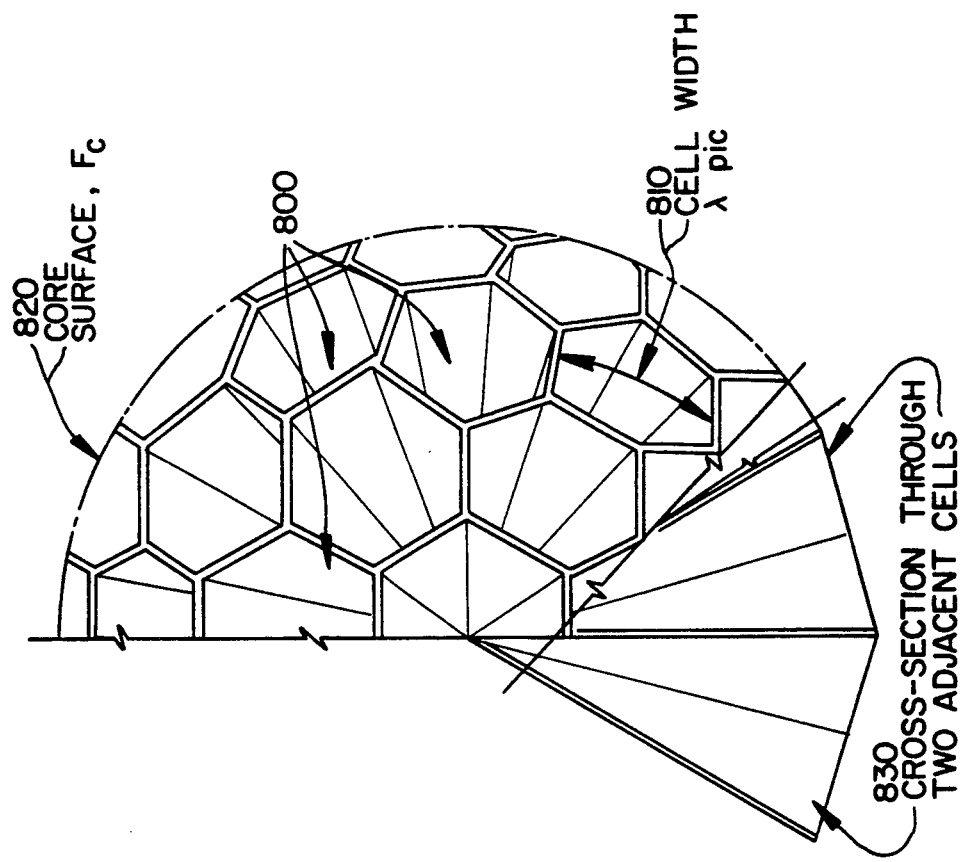

In reference to FIGS. 4b and 5a, the second type of waves are azimuthal-tangential T-waves 750, with wavelength $\lambda_{pic}$ 760, set up by exchange of energy between ion tangential kinetic energy 770 and azimuthal-tangential wave $E_\theta$ fields 750. These waves appear as quasi-hexagonal-conical cellular repetitive structures 800 of width $\lambda_{pic}$ 810 on the surface 820 of the core sphere at $r_c$, as shown in FIG. 5a (which also shows a cross-section 830 of two such cells), because the ion motion azimuthally is isotropic in angle in any given surface shell. The cells are not rigid as suggested in the figure, but are formed of ion density concentrations due to the ion-acoustic oscillations. These waves are then like an array of azimuthal honeycomb cells extending over that radial depth of core over which the criterion for their generation is satisfied. This criterion is that the fractional change in coupling length (mean free path, or wavelength is $\lambda_{pic}$) is identically equal to the fractional change in radial position with decreasing radius into the core.

This condition preserves azimuthal coherency with changing radial position and allows the establishment of the shell-like honeycomb $E_\Theta$ field structures, in which ions collide with electric fields due to acoustic waves azimuthally, and scatter off each other. Here, as for S-waves, if the density outside the ICC core scales as the inverse square of radius, the initiation condition is also independent of radius, as before. However, to create these waves it is necessary to have an azimuthal driver. The only driver available is that due to conservation of transverse momentum in ion flow to and through the potential well, as indicated in FIG. 4b. As previously discussed, this limits the ion motion so that ions can not approach the system center closer than a momentum-limited radius ($r_o$) given by the square root of the ratio of mean transverse energy ($E_t$) at the system injection surface (R) to the maximum radial energy ($E_r$) at injection or at the deepest point of the potential well, $(r_o/R) = (E_t/E_r)^{0.5}$. The ICC effect will be initiated at a radius comparable to or larger than that of the transverse-ion-momentum convergence limit $<r_o> = (r_o/R)$.

Ions approaching the central core region will all arrive with paths which lie between the two extremes of pure radial motion (transverse momentum is zero), or of pure azimuthal motion (with no radial component). Ions moving along radial paths can initiate radial (S) waves, while those following the second limiting path can initiate transverse or azimuthal (T) waves. Of course, ions with a combination of both motions (radial and azimuthal, as indicated in FIG. 4a) are capable of initiating either or both types of resonant acoustic waves in the core region. In either case, if the conditions of this process are met in accordance with the invention, the ions will drive resonantly-coupled acoustic oscillations in the core and will be trapped in the core by the acoustic wave structures thus produced.

This process can be seen by imagining a core made of surface-packed quasi-conical honeycomb ion density structures 840 over the entire core surface at the acoustic wave initiation radius $r_c$ 850, as shown in cross-section in FIG. 5b. An ion 860 entering one of the honeycomb "cells" will be scattered internally from the cell "walls" (which are actually the ion density waves associated with the acoustic wave resonant structure) and will be internally reflected 870 to the opposite wall, or may pass through a wavefront, being deflected into an adjoining cell 880, in which it is again reflected or scattered into still another cell region. The mean free path of such scattering collisions/deflections is exactly the ion acoustic wavelength at the local conditions of ion density and energy. This is always very small compared to the Coulomb scattering collision mean-free-path (mfp) for ion/ion energy exchange and, in systems of interest, small compared to the core dimension. In these circumstances, it is evident that the motion of particles inside the ICC core will be of a diffusive character, with each particle undergoing many collisions before it can traverse the core and exit again to the extra-core region, and thence return to the radial circulating flow of the overall device.

Since the particles are thus trapped by short (mfp) collisions, their density will build up inside the core to values very much larger than those that would be expected from simple Coulomb-collisional interactions without acoustic wave resonant coupling (i.e. without the ICC process and effect). Exact analysis of the motion and density distribution of such wave-trapped particles within the core is complex, as the deposition of ions within the core, from the external flow system, is approximately given by an ion source term of the form $S(r) \simeq j(r)/\lambda_s(r)$ where the uncollided deposition current density is given crudely by $$j(r) = j_c(r_o/r)^2 \text{EXP}[-(r_o-r)/\lambda_s(r)] \qquad (8)$$

Here $j_c = (nv)_c$ is the ion flux (radially) incident on the acoustic wave ICC core surface at $r = r_c$, $\lambda_s(r)$ is the average scattering mfp of ions to radius r within the core, and r is the ion-momentum-limited convergence radius, as before. Use of this expression as a source term in the normal wave equation is further complicated by the fact that the scattering mfp is, itself, a function of radial position, and should be written as an integral expression over the range $r_o \to r$. It varies with the density variation of the ions across the ICC core, and will act to trap particles increasingly as their density increases within the core (due to the decrease in $\lambda_s(r)$ as density increases with decreasing r).

A simpler model that gives an approximation to the particle density distribution can be invoked by treating the incoming particles as being deposited from the external ion flow into the critical core with a volumetric source term distribution given more simply by $S(r) \simeq (j_c/\lambda_{pic})[n(r)/n_c]^{0.5}$ within this core. This model ignores the increasing trapping effect mentioned above, and will give results generally less favorable (i.e. less density increase) than the real situation. However, it is useful to illustrate the nature of behavior of the system and to provide some lower bounds on the performance potential of the ICC process. With this model the description of ion density follows from the conservation equation $$D_r \nabla_r^2 [n(r) V_i] + S(r) = 0 \qquad (9)$$

where the diffusion coefficient is $D_r(r) = \lambda_{pr}/3 = (\frac{1}{3})[-2\pi E_w/Z^2 e^2 n(r)]^{0.5}$. Using $S(r)$ as above, this reduces to the simple wave equation $$\nabla_r^2[n(r)] + B^2[n(r)] = 0 \qquad (10)$$

Figure 6B:
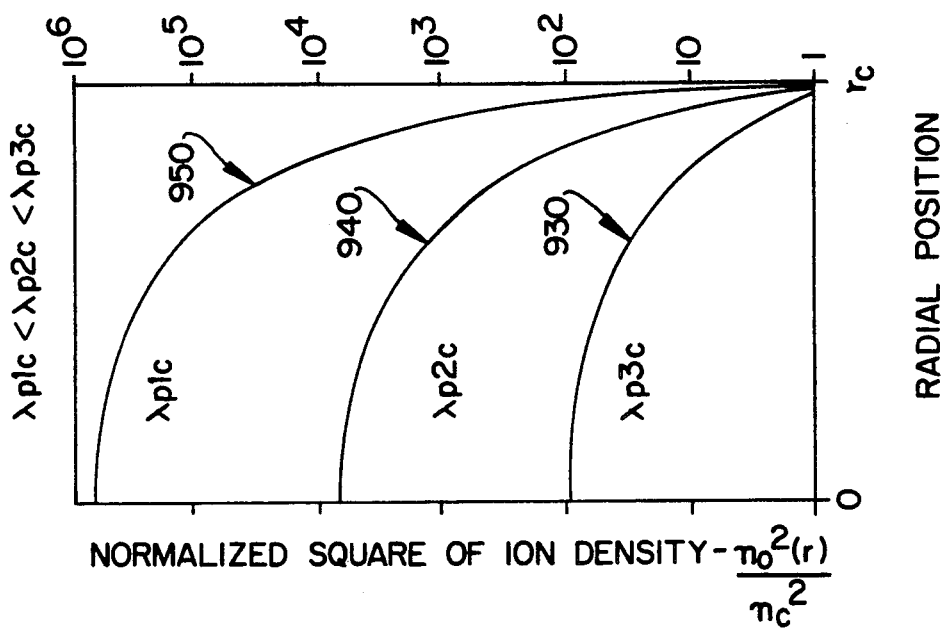
FIG. 6b shows the density enhancement factor as given by equation (21) in accordance with the preferred embodiment of the invention.
Figure 6A:
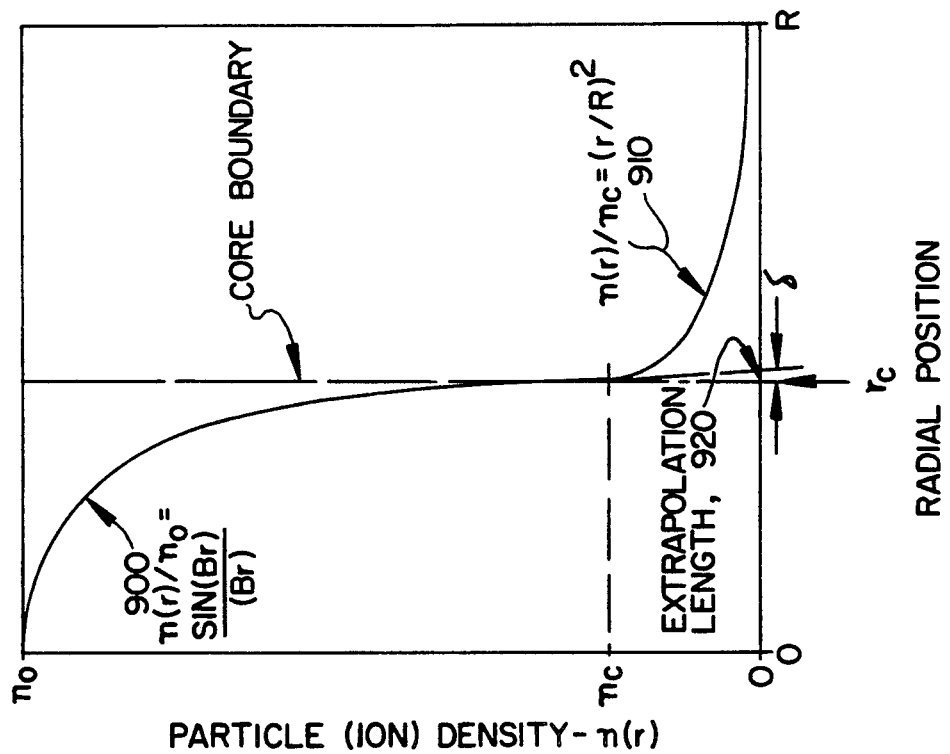
FIG. 6a shows the particle (ion) density vs. radial position of the ions in accordance with equation (11) of the preferred embodiment of the invention.

Here the constant is defined in terms of density and energy parameters in the system as $B = (\sqrt{3}/\lambda_{pic})$, and the density variation is found to be $$n(r) = n \text{SIN}(Br)/(Br) \qquad (11)$$

where the density $(n_o)$ is that at the center of the ICC core. This variation 900 is shown across the core region in FIG. 6a. Matching boundary conditions at the edge of the core with the ion density variation 910 outside the core requires that the ion density, in this diffusion model, go to zero at some hypothetical "extrapolation distance" ($\delta$) 920 outside the core radius, $r = r_c$, as shown in FIG. 6a. This condition requires that the wave equation constant, above, be also defined geometrically as $B = [N_R \delta/(r_c + \delta)]$, where $N_R$ is an integer equal to the number of core surface acoustic wavelengths contained in the core radius. The offset $\delta$ can be shown to be approximately $\delta \simeq (\pi/6)\lambda_{pic} = 0.52 \pi_{pic}$. Equating these two expressions for B gives a simple relationship between ICC core dimension, extrapolation distance and ion density and energy as $$\delta = (N_R \pi/3)\lambda_{pic} - r_c \text{ from which} \qquad (12a)$$

$$r_c = [(N_R \pi/3) - 0.8][\lambda_{pic}] \qquad (12b)$$

Since the onset conditions for S-waves are independent of radius, this simply shows that any radius $r_c > \lambda_{pic}$ is capable of sustaining such waves. In actual fact, however the $N_R = 1$ condition is favored as the fundamental mode of density variation across the core. This will be attained at a radius as small as $r_c \geq 1.29 \lambda_{pic}$, or for a density such that $$n_c \geq 2\pi(a_{ij})^2/(Zer_c)^2 = 7.27\text{E}7(a_{ij})[E_w/(Zr_c)^2] \qquad (13)$$

for $n_c$ in ions/cm$^3$, E in eV and $r_c$ in cm. For example for $E_w = 1\text{E}5$ eV, $Z^2 = 2$, and $r_c = 1.0$ cm, then $n_c \geq 3.63\text{E}12/\text{cm}^3$ for ICC operation if $a_{ij} = 1$ (ion/ion) or $n_c \geq 8.43\text{E}10/\sqrt{A}$ /cm$^3$ for ICC if (ion/electron) acoustic oscillations with ions of mass number A dominate the core.

The core convergence radius is determined by transverse momentum considerations external to the core, and is generally greater than the minimum $r_c$ cited above. However, for this condition the critical density for onset of ICC acoustic waves still is as given by Eq. (13). If this density is attained at this radius, the ICC effect will appear; and conversely. Once initiated, the actual ion acoustic wavelengths found within the core $r < r_c$ will decrease with increasing density as $r \to 0$, so that many such spherical waves will be found within the core envelope, under the $N_R=1$ fundamental mode. Higher mathematical order core density wave modes are possible, in principle, but practically only as small amplitude superpositions on the fundamental mode.

Note that, if n(r) varies as $1/r^m$ in the region external to the ICC core and internal to the surface at radius R at which ions enter the system with energy $E_w$, the system surface ion density must be $$n_{io} \geq 7.27 E_T(a_{ij})[E_w r_c^{m-2}/Z^2 R^m \pi \tag{14}$$

for initiation of ion acoustic waves and the ICC effect. For a typical variation with m=2 in the previous example case, for R=100 cm this yields $n_{io} \geq 3.63E8/cm^3$ for $a_{ij}=1$, or $N_{io} \to 8.43E6/\sqrt{A}/cm^3$ otherwise. If n(r) varies as m=3 these values are all lowered by a factor of 100.

Initiation of T-waves follows a slightly different criterion (as given in Eq. (4), above), that leads to the result that the critical radius for onset of ion acoustic T-waves depends upon the functional form of the ion density variation in the region just outside the ICC core. It is found that this critical radius is as follows $$r_c = r_o \quad \text{for uniform radial flow} \tag{15}$$
$$r_c = \sqrt{2}\, r_o \quad \text{for } (1/r^2) \text{ dependence for } r > r_c$$
$$r_c \approx 2\, r_o \quad \text{for ion density variation to conform to transverse momentum conservation in the converging radial flow}$$

Thus T-waves will be created as the ion current density azimuthal flow reaches a critical value. This is set both by the level of recirculating ion current flow outside the core and by the fractional transverse momentum of ions converging to the core region. Using a (typical) inverse-square geometric convergence the azimuthal ion acoustic wavelength is found to be $$\begin{aligned}\lambda_{p\theta} &= (a_{ij})(r_o/R)(\lambda_{pio}) \\ &= (a_{ij})(r_o/R)(2\pi E_w k_e/Z^2 e^2 n_{io})^{0.5}\end{aligned} \tag{16}$$

where $\lambda_{pio}$ is the acoustic wavelength calculated for conditions at the internal cavity outer radius, R, where the ion density is $n_{io}$. Since the ion density at the surface is related to the injection power and the ion recirculation ratio ($G_j$), and thus to the equivalent electron recirculation ratio, $G_j$, it is possible to write the T-wave acoustic wavelength in terms of injection power, for $E_w$ in eV, P in watts, and all dimensions in cm, as $$\Theta_{p\Theta}=7.22E\text{-}2\ (E_w^{2.5}/P_{inj}G_j)^{0.5}(a_{ij})(cm) \tag{17}$$

The number of surface cells must fit within the core circumference, thus the condition to be satisfied is $N_T(\lambda_{p\Theta})=2\pi(r_c)$, where $N_T$ is the (integer) number of cells around the core circumference. It is readily shown that the total number ($N_o$) of quasi-hexagonal cells that can be fitted on the surface of the spherical core is given by the formula $N_o=0.3675\ N_T^2$; so that $N_T=16$ gives a total number of cells of $N_o \approx 72$, for example. The smallest practical tangential cell number for resonant fundamental modes is $N_T=8$, with $N_o=24$. (It is noted that this simple formula for $N_o$ breaks down at $N_T=4$; geometric considerations for tetrahedral symmetry gives $N_o=8$ for such a resonant surface structure, but discreteness argues against coherency.) Using this and the simple integer condition above, the injection power can be related to the recirculation factor, the ion energy, and the acoustic wavelength, as previously in Eq. (6) for S-waves. The critical equation giving the power injection criterion for onset of T-waves is then $$P_{inj}=5.9E\text{-}3(a_{ij})(E_w^{2.5}/Z^2G_j)\ (watts) \tag{18}$$

which is seen to be closely comparable to the criterion for S-wave initiation, as given by Eq. (7). Thus, T-wave-trapped ions can serve to supply the core, as discussed above in connection with the wave equation description of the in-core ICC diffusion process.

Once started, such acoustic waves will readily propagate into the core and will be maintained by resonant coupling with the stream of inflowing ion momentum, both azimuthal and radial. Incoming particles will be trapped in acoustic wave structures, and will diffusively move through the core, building up density until a level is reached at which their outward diffusion-limited flow exactly balances the incoming flux. Ions escaping from this inertial-collisional-compression (ICC) core will be emitted isotropically into the extracore region. Thus azimuthally-isotropic incoming ions will be replaced by azimuthally-isotropic emitted ions, with no net change in transverse momentum content of the ion population. Ion energy within the core will remain sensibly the same as that at entry, since little energy is stored in the oscillating ion acoustic wave fields (as previously shown).

The net flux into the core must be equal to that leaving from the ICC effect region at $r \approx r_c$. This latter is just $D_c \nabla_r [v_i n(r)]|_{r_c}$ while the former is the average flow of ions into radius $r_c$ from the flow system outside the ICC core. Taking a cosinusoidal distribution of transverse momentum at the core boundary gives an average radial in-flow speed of $(2/\pi)v_i$. With this, equating ion fluxes from both sides of the core boundary surface $r_c$ yields the ratio of core maximum (central) density to surface density as given approximately by $$(n_o/n_c)=(r_c/D_c)=3r_c/\pi\rho_{ic} \tag{19}$$

where the subscript c indicates parameters evaluated at boundary conditions of the ICC core, at $r=r_c$, and $\lambda_{pic}$ is given by Eq. (3) for each choice of $a_{ij}$.

The functional form for n(r), given by Eqs. (3) and (11), can be integrated over the core volume, from which approximate (for $v_{pic} < < r_c$) integrated average $<n_o>$ and mean-square $<n_o^2>$ values of core ion density are found to be $$<n_o>/n_c=(3/\pi^2)(n_o/n_c) \tag{20}$$

and $$<n_o^2>/n_c^2=(3/2\pi^2)(n_o/n_c)^2 \tag{21}$$

The mean-square value is of interest in estimating fusion reaction rate densities and core power, since the fusion reaction density is given by $$q_f=(b_{ij})(<n_o^2>)(\sigma v_i) \tag{22}$$

where $b_{ij}=0.25$ if the reacting particles are alike, and is 0.5 if they are of different species, with equal density in the system. The fusion power is this rate density times the energy released per fusion ($E_f$), over the core volume $$P_f=(q_f E_f)(4\pi/3)(r_c) \tag{23}$$

The increase in fusion rate due to the ICC process, over that expected from conventional Coulomb collisions and geometric convergence in spherical flow systems, is then just the density enhancement factor given by Eq. (21), above. This is shown in FIG. 6b for typical parameter ranges of interest. In this the variation across the core is shown for successively larger values 930, 940, 950 of $\lambda_{pic}$.

The ICC process thus can yield greatly increased output from any spherical flow system, by design for operation at the appropriate density, current, and input power and voltage conditions, as required to initiate the ICC effect. The magnitude of this increase in potential output is suggested by the data in Table 1, following. This shows the range of ratios of integrated average density and of mean-square density normalized to core boundary density, $n_c$, and to ICC core radius $r_c$, for an ion collision energy of $E_w = 1E5$ eV, an average charge of $Z^2 = 2$, and for $a_{ij} = 1$ and with $a_{ij} = (1/61)$ as for D ions. The lower values given have been corrected slightly for approximations used in obtaining Eqs. (20, 21).

factor near unity to account for fuel ions of differing mass number, $A_1, A_2$ (for DD, $F(A) = 1$, for $D^3$He or DT, $F(A) = 0.91$, and for $p^{11}B$, $F(A) = 1.04$).

As an example of the potential of the ICC process consider a case using D and T ($b_{ij} = 0.5$, $F(A) = 0.91$) as the fusion fuels ) in an (ion/electron) ion-acoustic mode ($a_{ij}1/61$) system with core at $r = 0.5$ cm, $Z^2 = 2$, $n_c = 1E14/cm^3$, $E_w = 2E4$ eV, a fusion cross-section $\sigma_f = 2.0E\text{-}24$ cm$^2$, $E_f = 17.6$ MeV, and an electron recirculation ratio of $G_j = 300$, equivalent to an ion recirculating current ratio of only about $G_i = 4.4$. For these conditions, Eq. (24) gives the base power gain as $G_o = (-P_{fus}/P_{jmn}) = 184$. Such a device could be operated in a pulsed mode to attain high peak power densities, if continuous ICC operation requires excessive input power.

As a second example, consider an ion-acoustic mode case using fuels p and $^{11}$B ($a_{ij} = 1/143$), with $r_c = 1.8$ cm, $Z^2 = 5.5$, core boundary ion density $n_c 4E13/cm^3$, ion energy of $E_w = 3E5$ eV, $\sigma_f = 0.2E\text{-}24$ cm$^2$, $E_f = 8.7$ MeV, and $G_j = 2E3$ (ion current recirculation ratio $G_i = 2\text{-}0\text{-}26$). For this case the base power gain is still as high as $G_o = 112$. Note that the equivalent electron current

TABLE 1

POTENTIAL INCREASE IN AVERAGE AND MEAN-SQUARE DENSITY DUE TO ICC

| Core Boundary Density | Average Core Density ($<n_o>/n_c$) $(1/r_c)$, $(1/cm)$ | | Mean-Square Density ($>n_o^2>/n_c^2$) $(1/r_c^2)$, $(1/cm^2)$ | |
|---|---|---|---|---|
| $n_c$ (1/cm$^3$) | aij = 1 | aij = (1/61) | aij = 1 | aij = (1/61) |
| 1E9  | —       | 1.0–1.9   | —        | 2.2–4.5   |
| 1E10 | —       | 3.5–5.0   | —        | 22.3–44.6 |
| 1E11 | —       | 8.7–16    | —        | 223–446   |
| 1E12 | 1.3–2.0 | 23–45     | 0.6–1.2  | 2.2–4.5E3 |
| 1E13 | 3.0–5.0 | 73–147    | 6–12     | 2.2–4.5E4 |
| 1E14 | 7.4–15  | 230–460   | 60–120   | 2.2–4.5E5 |
| 1E15 | 20–40   | 730–1470  | 600–1200 | 2.2–4.5E6 |
| 1E16 | 62–120  | 2.3–4.6E3 | 0.6–1.2E4| 2.2–4.5E7 |
| 1E17 | 195–400 | 0.7–1.5E4 | 0.6–1.2E5| —         |

Note that the ion/ion mode ($a_{ij} = 1$) yields no useful increase for densities below about 1E12, and that the formulae give unrealistic values for the highest densities in the ion/electron mode ($a_{ij} = 1/61$). It is also important to note that the average density would be higher by the square root of the ratio ($1E5/E_w$), and the mean-square density by the ratio, itself, if ion energy less than 1E5 eV were used. Thus, if the ion energy sought were only 1E4 eV (10 keV), for example, the mean-square values, and the comparative fusion rate densities would all be larger by a factor of ten than the tabulated values. Also, larger charge will yield larger densities in direct proportion to the ratio $Z/\sqrt{2}$, thus multiply-charged fuels (e.g. $^{11}$B) will be ICC compressed more than will those with single charges (e.g. D,T).

Finally, it is possible to show conditions for net power generation in fusion systems operating under the ICC concept. A lower bound criterion for net power generation is given by comparison of minimum required injection $P_{jmn}$ of the system from Eqs. (7,18) and fusion power generation capability from Eqs. (22,23). Combining these (using the S-wave criterion of Eq. (7)) gives a (maximum) "base power gain potential" ($G_o$) for the system of $$G_o = (P_{fus}/P_{jmn}) \qquad (24)$$
$$= 7.80E\text{-}12[r_c^5 Z^4 n_c^3 \sigma_f G_j F(A)(b_{ij})/E_w^3(a_{ij})^3]$$

for cgs units, as before, with $E_f$ in MeV and $E_w$ in eV, $\sigma_f$ in cm$^2$. Here the function $F(A) = [(A_1 + A_2)/A_1 A_2]$ a recirculation ratio in each of these cases is less than that of conventional spherically-converging flow schemes[1,4-10] by a factor of the order of 100–1000, for the same general level of potential power gain performance.

This can be rewritten in terms of the ion energy, system momentum convergence limit and size, current recirculation ratio, and injection (or ion accelerating drive) power, for any given fuel combination, as $$G_o = 3.45E23 (G_j^4 P_{inj}^3 / <r_c> R)^*$$
$$(Z^4 E_f \sigma_f b_{ij} 4^{1.5} F(A)/E_w 7.5) \qquad (25)$$

where $<r> = (r_c/R)$ and R is the major radius of the inner cavity of the ICC machine. For fixed injection power $P_{inj}$, $G_o$ varies inversely with radius R. However, if the ion injection surface power density $p_{inj} = P_{inj}/4\pi R^2$ is kept fixed, the system base gain varies with the fifth power of the radius, R, as $$G_o = 6.84E26 (b_{ij})(R^5 G_j^4 p_{inj}^3 / <r_c>)^*$$
$$(Z^4 E_f \sigma_f b_{ij} 4^{1.5} F(A)/E_w 7.5) \qquad (26)$$

For this constraint condition and any specified parameter values, there is then always a value of R at which the base gain can be made unity or greater.

For the case of DT fuel at ion energy of $E_w = 2E4$ eV, with $Z^2$ taken to be 2, the system base gain becomes $$G_o(DT) = 4.83E\text{-}31(G_j^4 P_{inj}^3/<r_c>R) \quad (27)$$
$$= 9.58E\text{-}28(R^5 G_j^4 p_{inj}^3/<r_c>)$$

If R=100 cm, $G_j$=2E3 ($G_i$=28), $P_{inj}$32 2E6 watts, and $<r_c>$=1E-2, the base gain is then $G_o(DT)$=61.8. Reducing the radius to 25 cm and decreasing the equivalent electron recirculating current ratio to $G_j$=1000, holding the other parameters at their original values, still yields a base gain of 15.5.

All of these levels of potential performance are 100-1000 times better, higher, or more readily attainable than for their counterparts in conventional spherical electrostatic well systems; a direct result of employing the novel ICC effect and process in their design and description.

It is of some interest to note that the results of the experiments of Hirsch, which yielded anomalously high neutron production rates from a system using six opposed ion injection beams, might be a result of the phenomena described above. The parameters that characterized Hirsch's experiments[5] (beam energy and current, beam diameter, ion energy in the central core region, and system core dimensions) were not all well known, and neither Hirsch[5], nor Black[8], nor Baxter and Stuart[9] were able to explain these results. However, a liberal interpretation of Hirsch's reported data can be made that yields conditions in the central quasi-spherical core (formed at the intersection of the six ion beams) that are slightly beyond those minimally required for the onset of the ICC process effect.

Figure 7:
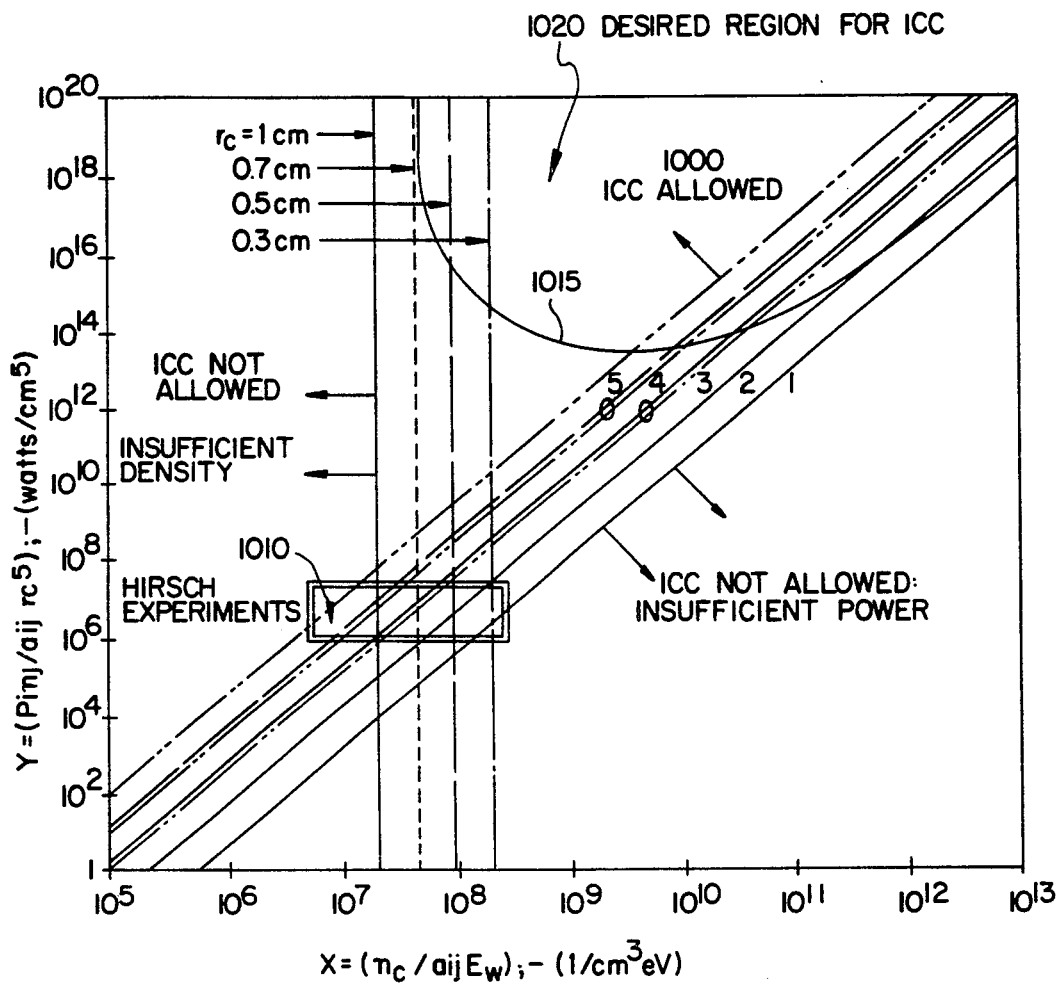
FIG. 7 illustrates the general regimes for operation of the ICC process.

The regimes of operation of the ICC process and the probable regime of the Hirsch experiments are depicted in FIG. 7. The ICC allowed region, labeled 1000, occurs between the "V" defined by any one of a selected vertical line corresponding to different critical radii $r_c$, and any one of the positive sloping straight lines 1, 2, . . . 5. The allowed region thus extends to the right of the vertical line, for a given vertical line choice $r_c$, (a more positive X value), and to the upper portion, (corresponding to more positive Y value), of the selected positively sloped line, 1, 2, etc. The vertical lines corresponding to a selected value of $r_c$ are plotted on the X axis from constraint equation (5) above and represent density per unit well depth. The parameter Y, in units of power per $cm^5$, is taken from combining constraint equations (5) and (7), and is evaluated for exemplary values of $E_w$ and $G_j$ as seen in the bottom block portion of FIG. 7. The lines 1, 2, etc are defined using selected combinations of the ion energy at the core or well depth $E_w$ and the electron current recirculation ratio $G_j$. In some cases, there are more than one pair of values for $E_w$ and $G_j$ in a given block, e.g., line 3, and in such cases the graphic results do not differ significantly from one pair to the next as represented by the small circles next to the lines labeled 3 and 4.

Thus, a representative allowed regime for the ICC process, could be that defined by the "V" between line 1 and $r_c$=1cm. In accordance with equations (5) and (7), the appropriate values of density and injection power may be calculated to produce the ICC operation for any point selected within the "V". ine 1015, defining region 1020 in the upper right protion of the graph, has been drawn in FIG. 7 to represent a reasonable choice of an operation regime not too close to the boundary regions where small pertubations may result in instability.

FIG. 7 also indicates the range 1010 over which Hirsch's experiments might have operated. The slight overlap shown over a restricted range of parameters is far from the range of conditions desired for ICC effective operations, as shown at 1020 in FIG. 7.

Electrode Arrangements

It will be understood that any means of accelerating ions radially inward in a manner that minimizes transverse motion may be employed to provide a densification of ions towards the center of a spherical (or cylindrical) geometry, and that such acceleration at current and voltage (particle energy) conditions described here as required for the initiation of the collisional-diffusion processes of the ICC effect, can result in the onset of this effect.

Figure 8:
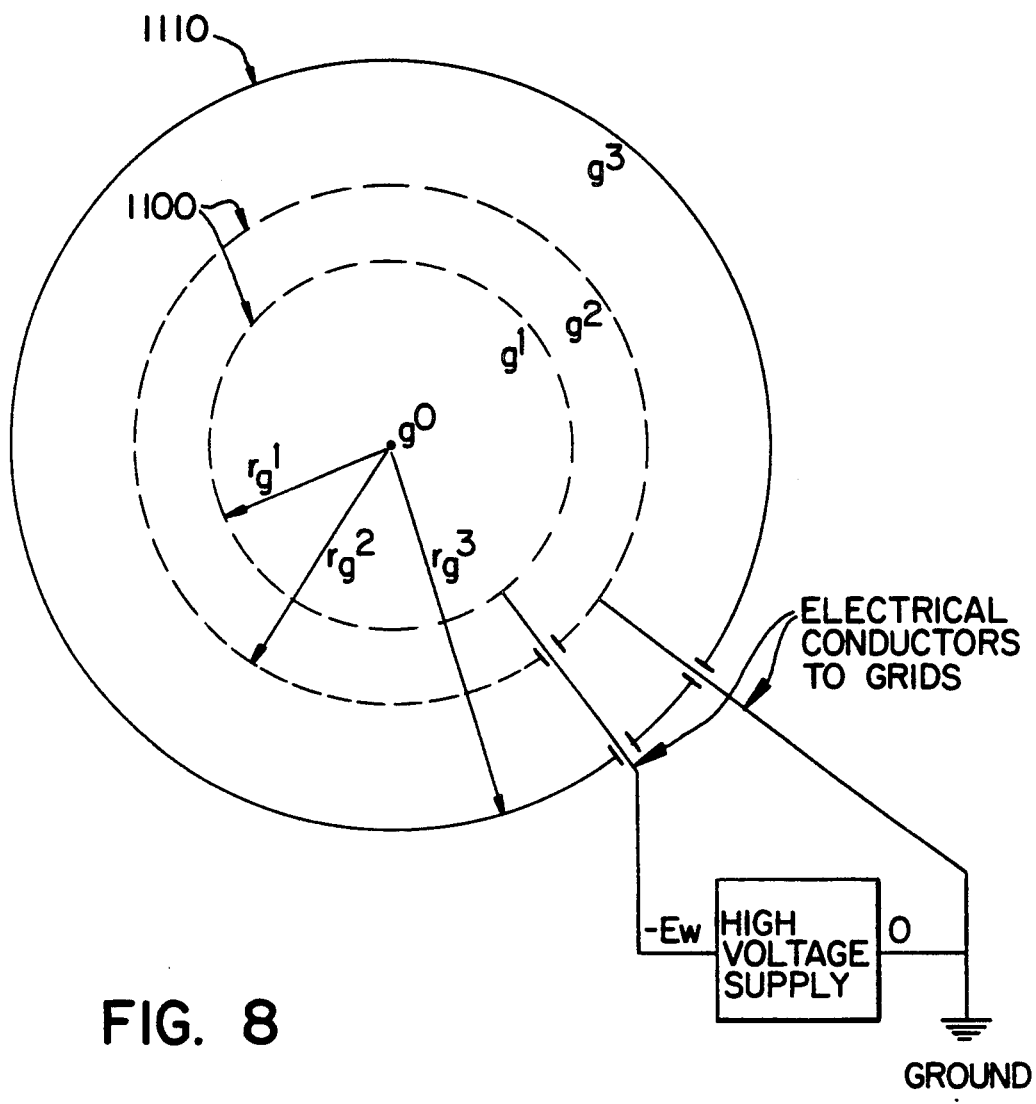
FIG. 8 shows an example of the structure for the inner and outer electrodes used for accelerating ions and also illustrates an outer electron-reflective bounding surface.

However, the nature of this effect allows the invention of special apparatus for the achievement of the process and conditions required for its attainment that are uniquely simple and devoid of extensive complex structure. These are all based on use of minimal wire frame or sheet conductor or distributed point conductor electrode grid systems, g1, g2, 1100 (FIG. 8) to provide spherical (or cylindrical) radial electric field gradients for acceleration of ions to the system center, g0, the whole being surrounded by and contained within a concentric outer electron-reflective bounding wall or surface 1110, as shown in cross-section in FIG. 8. (It is noted that FIG. 8 represents a cross sectional view for either a spherical or cylindrical system). In this circumstance, a system of spherical colliding flow of ions (and electrons) can be devised in which the ion-accelerating fields are provided by simple grids of large transparency, and system power consumption is kept small by avoiding the use of electric currents to create high magnetic fields.

Figure 9:
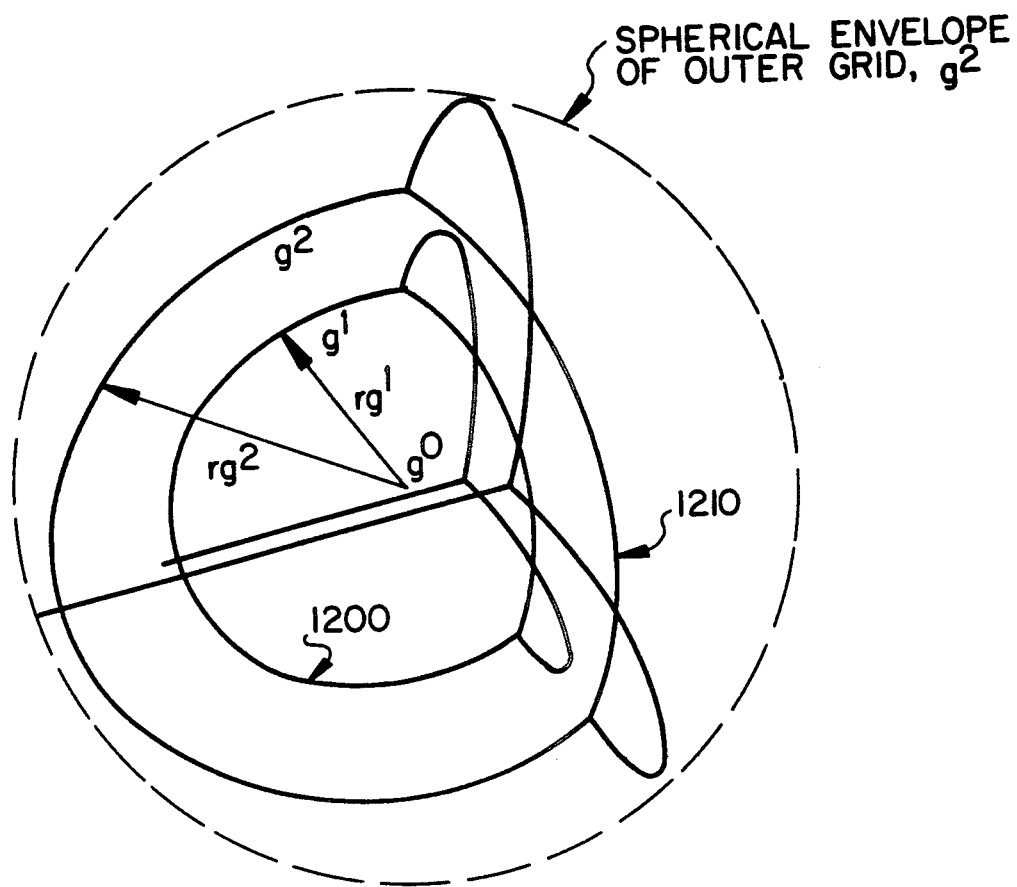
FIG. 9 show an electrode structure in accordance with the invention using a minimal curvilinear tetrahedral wire frame geometry with two nested grids.
Figure 10:
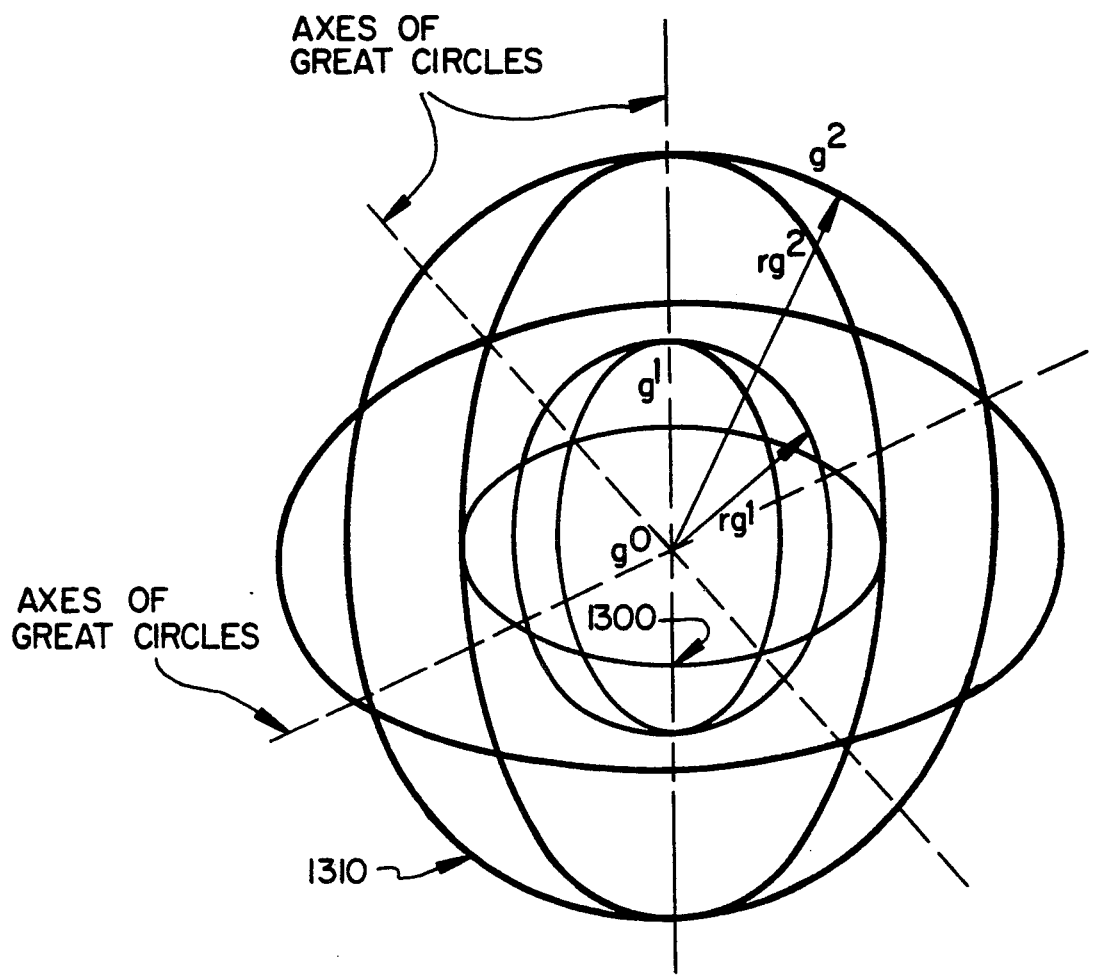
FIG. 10 shows an electrode structure in accordance with the invention using a nested set of three orthogonal circles.
Figure 11:
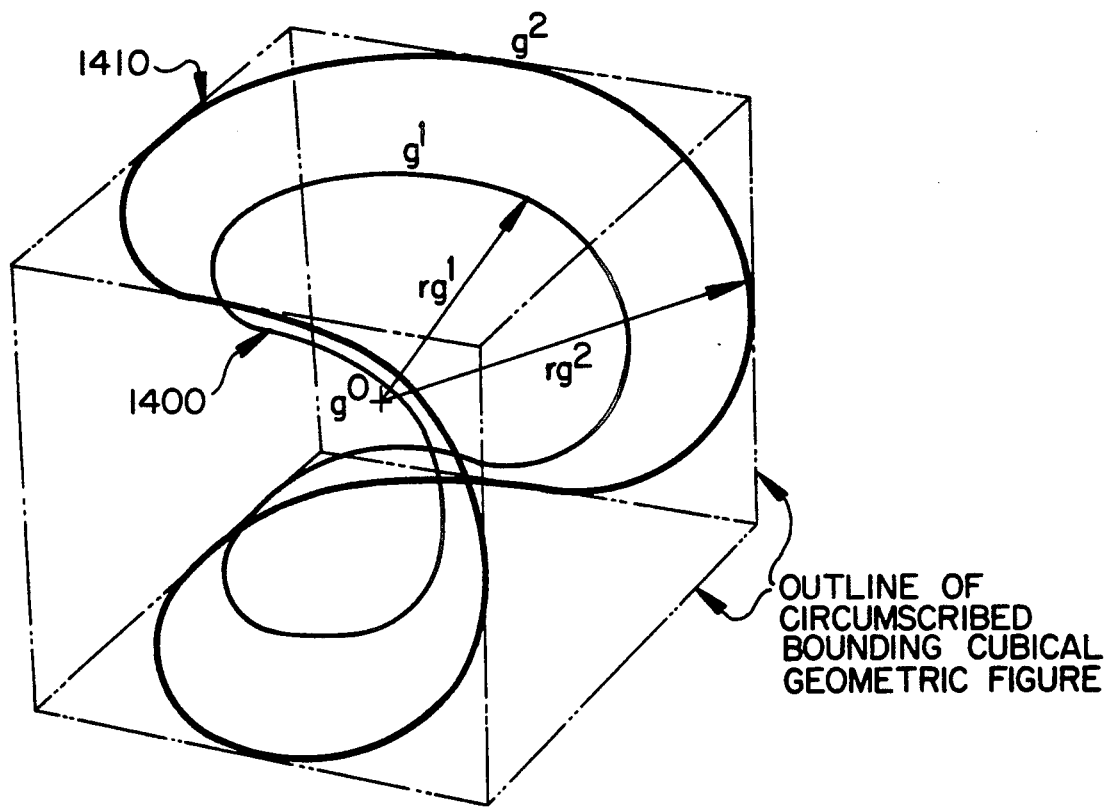
FIG. 11 shows an electrode structure in accordance with the invention using a set of "tennis ball seam" continuous curvilinear electrodes.
Figure 12:
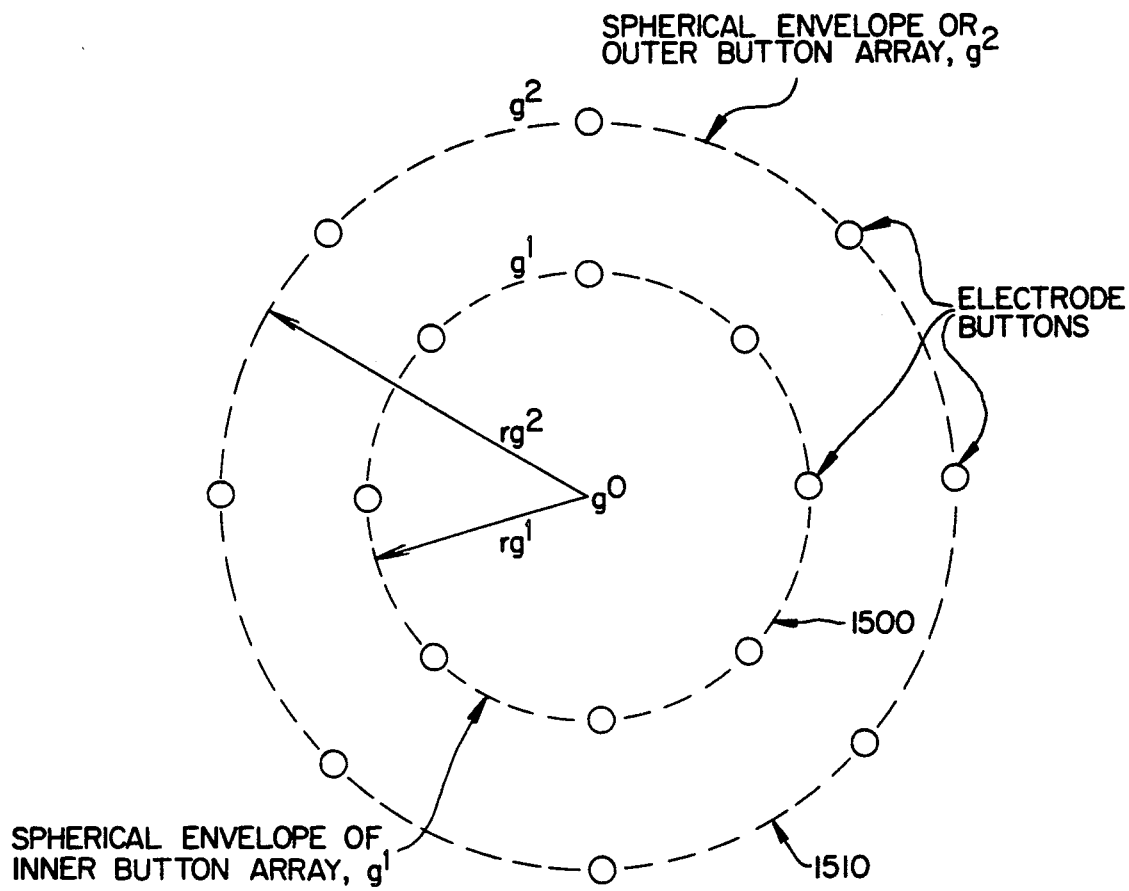
FIG. 12 shows a cross sectional view of an electrode structure in accordance with the invention using a concentric array of point conductor or buttons acting as electrodes.

FIG. 9 shows an example of one such electrode system for ion acceleration, using a minimal curvilinear tetrahedral wire frame geometry with two nested grids, g1 1200 and g2 1210. FIG. 10 shows a nested set of three orthogonal circles 1300, 1310 (a curvilinear octahedron or "great circle" geometry), FIG. 11 indicates a set of "tennis ball seam" continuous curvilinear electrodes, 1400, 1410, and FIG. 12 shows (in cross-section) a concentric array of point conductor "buttons", 1500, 1510 acting as electrodes. Note in each figure that there are two concentric spherical surfaces at radii rg1 and rg2, on which the inner g1 and outer g2 electrodes are located, around a central point g0, and that the electrodes in one surface match those in the other in angular position. This is always so in order to minimize curvature in the electrostatic field that is maintained between the two electrodes, in order that the accelerating force on ions in the interelectrode space be made as nearly perfectly radial as possible.

The closer the ions can be made to follow exact radial motion, the less will be their transverse momentum content and the smaller will be their minimum convergence radius, r (related to the ICC core radius $r_c$ by Eqs. (15), which show that $r_o \leq r_c \leq 2r_o$). This is important in achieving conditions for onset of the ICC effect, which requires that the surface current density at $r_c$ exceed certain levels (previously described and defined) in order to initiate collisional phenomena that cause ion density to increase within this radius. If the ions have large transverse momentum content, the total current required for ICC onset will be excessively large, and the system will not practically reach the appropriate conditions. Thus, the choice of means to accelerate ions inward is critical; pure radial acceleration is the preferred mode.

One such means is to make use of the minimal wire frame or button electrode structures discussed above, in which spherical symmetry of the field is maintained by the rapid azimuthal flow of electrons around the spherical surface, on surfaces of equipotential. Transverse (angular) electron flow will occur naturally along equipotential surfaces containing these grid structures, as observed in experiments of Litton and vanPassen[14] on wire-frame hollow cathodes with highly non-uniform electron injection means. Alternatively, inner and outer (first and second) grids can be made of mesh screening (e.g. in the fashion of "chicken wire" screening), if of reasonable transparency.

Note, in this regard, that ion current recirculation ratios required to provide net base gain above unity with the ICC effect, are only on the order of 10-100. Thus, screen grids with 1-10% solidity can be used for this function. However, the loss of electrons circulating in the system will also be governed by the solidity/transparency of these grids, and by losses due to collisions with the external boundary surface of the system, outside the ion-accelerating-grid region. Electron losses constitute a power loss to the system, which may exceed that due to requirements of ion injection power to initiate the ICC effect. There is thus an incentive to construct high-transparency grid systems, in order to minimize internal electron losses.

Electron losses external to the ion-accelerating-grids may also be reduced by use of a third (outer) grid provided around the inner two, in order to decelerate electrons escaping outward from the ion-accelerating region of the inner two grids. If this outer grid is biased at negative potential relative to the next inner grid it will prevent or reduce electron losses from the system due to their collision with external wall/boundary structures. This is not necessary for initiation of the ICC effect, but is useful for conservation of electrons (and thus for preserving electron recirculating current).

The fractional solidity ($f_s$) of the wire frame grids is determined by the total area on the grid frame sphere at radius R subtended by the total length (L) of wire structure, divided by the spherical area, itself; this is just $f_s = Ld/4\pi R^2$, where d is the diameter of the wire, or width of the grid frame sheet if metal sheet conductors are used. The total length of conductor in each of the three wire frame geometries of FIGS. 9, 10, and 11 is found as $L = 3.84(\pi R)$, $6(\pi R)$ and $\sqrt{2}(\pi R)$ for the curvilinear tetrahedron, octahedron, and "tennis ball seam", respectively, and their corresponding solidity fractions are $f_2 = 0.96(d/R)$, $1.5(d/R)$ and $0.708(d/R)$. Thus, if d = 0.1 cm is the grid wire or sheet thickness, and the inner grid surface radius is at R = 100 cm, the solidity fraction will be of the order of 1E-3, and the allowed ion and electron current recirculation ratios can be $G_i \approx (1/f_s) \approx 1E3$. Larger wires or closer spacing will reduce the allowable recirculation ratios.

The transparency of rod or button electrode arrays is generally greater than that attainable with continuous wire frame or sheet electrode systems, for the same degree of "stiffness" of the overall structure. For example, the solidity fraction of an array of N buttons, each of radius $r_b$, is $f_s = Nr_b^2/4\pi R^2$; for N = 6 (at the vertices of an octahedron) and $r_b = 0.2$ cm, the solidity fraction will be $f_s = 3.2E-6$ in a system with R = 100 cm.

Within the two inner grids the electron current flow should be at approximately the same speed (although somewhat larger) as that of the ions, so that the usual factor of $(m_i/m_e)^{0.5} \approx 70-100$ increase in electron current above the ion current flow is not present. Outside the outermost grid (of the inner two comprising the ion acceleration grid system), electron current reflux will tend to the higher value ratio. It is here that wall and grid collision losses (with an outer third grid or external wall) can result in excessive power losses to the system, as mentioned above. These can be inhibited in a variety of ways, such as by the use of electron-reflective surface magnetic fields, as proposed by Limpaecher[15], or by polyhedral fields as proposed by Bussard[1,12], or by "magnetic insulation" as proposed by Hirsch[10], or by an electrostatic potential bias of sufficient magnitude on the wall surface, or by any other means well known in the art. If necessary, by these means the external electron losses may be suppressed and electron recirculation ratio may be kept high enough to allow net power to be generated from such devices as limited only by the base gain ($G_o$) limits of the ICC process, itself.

It is important to note that no net current flow paths should be allowed on or in the two ion accelerating grid structures, in order to ensure that there be no magnetic fields around these wires. The reason for this is that the motion of ions (and electrons) through the grid spacing can be affected by any significant fields due to grid wire currents, in such a way as to introduce curvature and non-radial motion to the ion paths, and thus to reduce their ability to converge to the smallest possible core radius. This can be avoided by utilizing dual parallel grid conductors, electrically connected in counter-current fashion, so that any grid wire current flows (from particle collisions with the grid structure) will yield cancelling magnetic fields from each grid conductor pair.

With such an array of grid wires, the device can be started by applying the ion accelerating voltage across the inner two grid conductor systems. The innermost grid must be biased negatively relative to the outer accelerating grid, so that ions will be attracted towards the system center. Conversely, electrons in the inter-grid space will be accelerated away from the center, and will collide with neutral atoms within this space, thus ionizing them. The ions so produced will be accelerated through the innermost grid and will converge towards the core region, while the electrons so produced will be accelerated outward through the outer accelerating grid.

The energy of the ions created in this manner will vary from near zero energy (those created by collisions very near to the inner grid) to the maximum energy of the full grid accelerating potential (those created by collisions very near to the outer grid). The energy distribution from this inter-grid volume will be weighted by the square of the ratio of the radius of birth position to the inner grid radius, so that more ions will be found at high energy, above the mean, than at low energy.

Even though the ions have differing energy and radial momentum, the spherical flow geometry ensures that all collisions will occur very near to the system geometric center, with the result that such two-body ion/ion collisions between ions of differing energies can not distort the ion energy distribution from that imparted in the initial inter-grid ionization and acceleration process. Neither slow nor fast ions can be collided with in a manner to make their energy change in the system frame of reference. The mean ion energy in the system will be less than the inter-grid accelerating potential energy, thus, if a mean ion energy of $E_w$ is desired in the core region of the system, the grid potential difference should be set higher than $E_w$.

Electrons must be made available to the ions entering the space within the innermost grid, in order to prevent the buildup of an excessive virtual anode potential by ion compaction at the system center. This can be done by allowing electrons to be emitted from the inner grid, in the fashion of Hirsch[5,6], which then follow the ions in their inward path; attracted by their space charge. Alternatively, electrons recirculating in the region external to the ion accelerating grids, and within the accelerating grid space will likewise be attracted by the space charge induced by ion motion, and can thus provide a source for the central region.

By these means the ion kinetic collisional energy, which is preserved within the ICC collision-diffusion core—and forms the basis for the fusion reaction collisions therein—can be kept to a reasonable (large) fraction of the ion injection energy, thus maintaining efficient use of the injection power required for ICC initiation.

Fuel ions which undergo fusion will disappear from the system, as their fusion products are too energetic to be captured by the ion accelerating fields that drive the ICC machine in the first place. These fusion products will escape from the active core region and will travel radially outwards until intercepted by structure or decelerated by externally-provided electric fields. Fuel ion makeup can be accomplished by injection of neutral atoms of the fuel, by use of neutral-particle beams or by supersonic gas injection nozzles, so that they are directed towards a region of the system where it is desired that they be ionized by collisions with in-situ ions or with electrons already oscillating in the system. This method is simple, readily controllable, and allows adjustment of the ion density and energy distribution to levels somewhat different from those which arise naturally at and during startup of the device. For example, placement of the injected fuel into the outer sections of the ion accelerating grid space will cause the mean ion energy to rise from its natural half-accelerating-potential value, because nearly all of the injected atoms will be ionized near the outer accelerating grid, and thus will gain maximum energy from the ion accelerating grid potential system.

As was seen in the previous discussions, it is possible to create base system gain values well in excess of 30–100 by use of the ICC effect with very modest ion current recirculation ratios in systems of reasonable size ($R \leq 100$ cm). It was further shown that the minimum power required for ICC process onset could be as low as 20–800 kw. Thus small devices with large fusion power output (e.g. 1 m radius, 100 kw in, 10 Mw out) appear possible by this novel invention. And, as for other electrostatic confinement concepts, the ICC machine can work as well with non-radiative fuels (fusion fuels that do not produce neutrons) as with the easier-to-burn neutron-producing fuels, so is well-suited to use in normal radiation-free human environments.

In addition, since the fusion products from such non-radiative fuels are all charged particles with very high particle energies, they can all be slowed down by electric potentials provided by additional grid systems external to the ion accelerating grids and the core, and thus create electrical energy in external circuits by direct conversion within the ICC machine. Such direct conversion can be made very efficient (above 70% of the particle energy can appear directly as electricity), thus such devices offer promise for use in a wide array of civil, industrial, urban, airborne, and space-based systems.

The ICC effect and process allows any spherically-convergent ion and electron flow system to work at performance levels vastly greater than heretofore imagined. This fact allows the conception of new and novel means for exploitation of this effect, which employ minimal grid conductor structures in simple geometries, capable of high power gain, with small power input and large power output from fusion reactions between ions supplied to the system.

REFERENCES

1. R. W. Bussard, "Method and Apparatus for Controlling Charged Particles," U.S. Pat. No. 4,826,646, issued May 2, 1989

2. W. C. Elmore, J. L. Tuck, and K. M. Watson, "On the Inertial-Electrostatic Confinement of a Plasma", Phys.Fluids, Vol.2, No.3, pp.239–246 (May–June 1959)

3. H. P. Furth, "Prevalent Instability of Nonthermal Plasma", Phys. Fluids, Vol. 6, No. 1, pp. 48–53 (January 1963)

4. P. T. Farnsworth, U.S. Pat No. 3,258,402, "Electric Discharge Device for Producing Interactions Between Nuclei," issued June 28, 1966, and U.S. Pat. No. 3,386,883, "Method and Apparatus for Producing Nuclear Fusion Reactions," issued June 4, 1968

5. Robert L. Hirsch, "Inertial-Electrostatic Confinement of Ionized Fusion Gases", Jour. Appl. Phys., Vol 38, No. 11, pp. 4522–4534 (October 1967)

6. R. L. Hirsoh, U.S. Pat. No. 3,530,036, "Apparatus for Generating Fusion Reactions," and R. L. Hirsch and Gene A. Meeks, U.S. Pat. No. 3,530,497, "Apparatus for Generating Fusion Reactions," both issued Sept. 22, 1970

7. T. J. Dolan, J. T. Verdeyen, D. J. Meeker, and B. E. Cherrington, "Electrostatic-Inertial Plasma Confinement," Jour. Appl. Phys., Vol. 43, No. 4, pp. 1590–1600 (April 1972)

8. W. M. Black, "Theory of potential well formation in an electrostatic confinement device," Jour. Appl. Phys,Vol. 45, No. 6, pp. 2502–2511 (June 1974)

9. D. C. Baxter and G. W. Stuart, "The effect of charge exchange on ion guns and an application to inertial-electrostatic confinement devices," Jour. Appl. Phys., Vol. 53, No. 7, pp. 4597–4601 (July 1982)

10. Robert L. Hirsch, "U.S. Pat. No. 3,664,920, "Electrostatic Containment in Fusion Reactors," issued May 23, 1973

11. L. C. Marshall and H. Sahlin (eds.), "Electrostatic and Electromagnetic Confinement of Plasmas and the Phenomenology of Relativistic Electron Beams," Proceedings of a conference held March 4–7, 1974, publ. as Vol. 251 of the Annals of the New York Acad. of Sci., New York, 1975

12. R. W. Bussard, "Magnetic Inertial-Electrostatic Confinement: A New Concept For Spherical Conversion-Flow Fusion," technical paper sub. for publ. to Fusion Technology, Sept. 27, 1989

13. R. W. Bussard, et al, "Preliminary Research Studies of a New Method for Control of Charged Particle Interactions,"PSR Report No. 1899, Nov. 30, 1988, Final Report under Contract No. DNA001-87-C-0052, Defense Nuclear Agency 14. James Litton, Jr. and H. L. L. van Paassen, "Electron Beam Production From Perforated Wall Hollow Cathode Discharges," in the Proceedings of the 23rd Conference on Physical Electronics, pp. 185–194 (1963)

15. Rudolf Limpaecher, U. S. Pat. No. 4,233,537, "Multicusp Plasma Containment Apparatus," issued Nov. 11, 1980

What is claimed is:

1. Apparatus of enhancing nuclear fusion reactions comprising:
   a) a plasma, made up of ions and electrons, contained with a core region having a core radius;
   b) means for directing said ions and electrons of said plasma to converge toward said core region which includes one of (1) a central axis of a cylindrical system and (2) a center of a generally spherical system;
   c) means for recirculation said plasma in generally radial motion outwards from said core region and returning thereto by the action of the directing means on the ions and electrons of the plasma, and;
   d) means for enhancing the density of said plasma in the core region so as to increase nuclear fusion reactions by generating ion-acoustic electrostatic waves therein, said ion-acoustic electrostatic waves reducing the collisional mean free path of said ions to dimensions set by the wavelength of the said ion-acoustic electrostatic waves creater therein, thus enhancing density by collision-diffusion trapping of said ions to thereby enhance nuclear fusion reactions.

2. Apparatus as recited in claim 1 wherein said directing means comprises:
   a first, inner electrode structure and a second outer electrode structure spaced apart form one another;
   said first and second electrode structures being permeable to ions and electrons and being generally spherical and centered about said center of said generally spherical system, and
   means for providing a potential difference between said first and second electrode structures so as to accelerate positive ions located outside said first electrode structure inwardly, through said first electrode structure and toward said center.

3. Apparatus as recited in claim 2 wherein said first and second electrode structures are enclosed in an electron reflective boundary wall.

4. Apparatus as recited in claim 2 wherein said first and second electrode structures comprise sets of grid wires.

5. Apparatus as recited in claim 2 wherein said first and second electrode structures comprise sheet conductors.

6. Apparatus as recited in claim 2 wherein said first and second electrode structures comprise point or button-like electrodes.

7. Apparatus as recited in claim 1, wherein said directing means comprises:
   a first, inner electrode structure and a second outer electrode structure spaced apart form one another;
   said first and second electrode structures being permeable to ions and electrons and being generally cylindrical about said central axis of said cylindrical system;
   means for providing a potential difference between said first and second electrode structures so as to accelerate positive ions located outside said first electrode structure inwardly, through said first electrode structure and toward said central axis.

8. Apparatus as recited in claim 7 wherein said first and second electrode structures are enclosed in an electron reflective boundary wall.

9. Apparatus as recited in claim 7 wherein said first and second electrode structures comprise sets of grid wires.

10. Apparatus as recited in claim 7 wherein said first and second electrode structures comprise sheet conductors.

11. Apparatus as recited in claim 7 wherein said first and second electrode structures comprise point or button-like electrodes.

12. Apparatus as recited in claim 1, wherein said directing means comprises two concentric spherical arrays of conducting electrodes having electrode elements thereon, said elements of each array positioned with spherical angular coordinates so as to generally correspond to those of one another and energized to electric potentials so as to accelerate ions inwardly with energies in the range of 5 keV to 150 keV for the collisional-compression of ions of deuterium (D) with ions of D and/or tritium (T) and/or helium-3 ($^3$He), and to 35 keV to 700 keV for the collisional compression of ions of hydrogen (protons, p) with ions of lithium-6,7 ($^6$Li, $^7$Li), beryllium-9 ($^9$Be), boron-11 ($^{11}$B), or other suitable combinations capable of undergoing nuclear fusion reactions.

13. Apparatus as recited in claim 1 wherein said directing means comprises wires or sheet strip conductors oriented so that their small dimension (thickness) is arranged to be circumferential and their large dimension (width) is arranged to be radial, said conductors arranged in a spherical geometric pattern to lie in centrally-fixed planes containing the edges of any regular or irregular polyhedron.

14. Apparatus as recited in claim 1 wherein said directing means comprises wires or sheet strip conductors oriented so that their small dimension (thickness) is arranged to be circumferential and their large dimension (width) is arranged to be radial, said conductors arranged in a spherical geometric pattern to lie along the path of any curvilinear winding that circumscribes a sphere with approximately equal areas between adjacent elements of the geometric pattern.

15. Apparatus as recited in claim 14, wherein said spherical geometric pattern is selected from the group of a curvilinear cube, tetrahedron, octahedron, dodecahedron, or "tennis ball seam" winding.

16. Apparatus as recited in claim 1 wherein said directing means comprises conductors arranged in a spherical geometric pattern to lie in centrally-fixed planes containing the edges of any regular or irregular polyhedron figure, said conductors in the form of a "button", point or rod electrodes placed at the vertices of said polyhedral figures.

17. Apparatus as recited in claim 2, wherein said first and second electrode structures include means for minimizing magnetic fields due to current flow within said electrode structures, thus avoiding magnetic influences on ion/electron motion within said region, and thus allowing the electric fields resulting from said potential difference to effect and control the motion and collisional-compression of ions within the spherical system.

18. Apparatus as recited in claim 17 wherein said minimizing means includes means for passing current through said first electrode structure in pairs of opposing current paths so as to null effects of any magnetic field resulting from current flowing in a single current path, and further includes means in said second electrode structure for passing current through said second electrode structure in pairs of opposing current paths so as to null effects of any magnetic field resulting from current flowing in a single current path.

19. Apparatus as recited in claim 7, wherein said first and second electrode structures include means for minimizing magnetic fields due to current flow within said electrode structures, thus avoiding magnetic influences on ion/electron motion within said region, and thus allowing the electric fields resulting from said potential difference to effect and control the motion and collisional-compression of ions within the cylindrical system.

20. Apparatus as recited in claim 19 wherein said minimizing means includes means for passing current through said first electrode structure in pairs of opposing current paths so as to null effects of any magnetic field resulting from current flowing in a single current path, and further includes means in said second electrode structure for passing current through said second electrode structure in pairs of opposing current paths so as to null effects of any magnetic field resulting from current flowing in a single current path.

21. Apparatus as recited in claim 1 wherein said means for directing comprises an inner grid array (g1) whose radius (rg1) is in the range of 20 cm $rg1 < 200$ cm, and an outer concentric grid array (g2) larger than and separated from the inner grid array by a radial spacing ($\delta r12$) in a range limited by electrical arc breakdown between the concentric grid arrays.

22. Apparatus as recited in claim 21 wherein the minimum practical arc-breakdown-limited radial spacing (in cm) is given by the formula $\delta r12 \geq E_g/20$, where $E_g$ is the electric potential difference between the inner grid array (g1) and its surrounding outer grid array (g2), in thousands of volts (kilovolts, kV).

23. Apparatus as recited in claim 22 wherein said potential difference $E_g$ is in the range of 5 kV $< E_g <$ 600 kV.

24. Apparatus as recited in claim 23 wherein $E_g = 400$ kV corresponding to a grid spacing of $\delta r12 \geq 20$ cm, and wherein said potential difference is selected to be greater than the desired mean ion energy $E_w$ of said ions at said grid array (g1).

25. Apparatus as recited in claim 21 wherein said directing means further includes an additional grid array placed outside the inner and outer grid arrays, and means for supplying an alternating electric potential to said additional grid array outside the region of the inner and outer grid arrays in order to control the motion of electrons between said outer and additional grid arrays.

26. Apparatus as recited in claim 25 wherein said additional grid array is disposed spherically symmetrically around the inner and outer grid arrays, conforms to the shape and angular position of the outer grid array and is energized oppositely to the voltage difference between said inner and outer grid arrays so that electrons accelerated in an outward direction between grids g1 and g2 will be decelerated and returned inward in the region between g2 and g3.

27. Apparatus as recited in claim 1 wherein said means for directing comprises an inner grid array (g1) having a radius (rg1), and an outer concentric grid array (g2) larger than and separated from the inner grid array by a radial spacing ($\delta r12$), and an additional grid array placed outside the inner and outer grid arrays, and means for supplying an alternating electric potential to said additional grid array outside the region of the inner and outer grid arrays in order to control the motion of electrons between said outer and additional grid arrays.

28. Apparatus as recited in claim 27 wherein said additional grid array is disposed spherically symmetrically around the inner and outer grid arrays, conforms to the shape and angular position of the outer grid array and is energized oppositely to the voltage difference between said inner and outer grid arrays so that electrons accelerated in an outward direction between grids g1 and g2 will be decelerated and returned inward in the region between g2 and g3.

29. Apparatus as recited in claim 27 wherein said additional grid array is formed of a plurality of conducting wires arranged in a rectangular pattern to form rectangular cells, as in a wire mesh screen, and wherein each wire carries current in such a manner that each rectangular cell is surrounded by a loop of current producing a central magnetic field within the cell such that each adjacent cell is of opposite magnetic polarity, said central magnetic fields reflecting outgoing electrons at the radial position of the additional grid array and returning them on inwardly directed trajectories.

30. A method of enhancing nuclear fusion reactions comprising the steps of:
   a) forming a plasma, made up of ions and electrons, with a core region;
   b) directing ions and electrons of said plasma to converge toward one of (1) a central axis of a cylindrical system and (2) a center of a generally spherical system;
   c) recirculation said plasma in generally radial motion outwards from said core region and returning thereto by the action of the directing means on the ions and electrons of the plasma, and;
   enhancing the density of said plasma in the core region so as to increase fusion reactions by generating ion-acoustic electrostatic waves therein, said ion-acoustic electrostatic waves reducing the collisonal means free path of said ions to dimensions set by the wavelength of the said ion-acoustic electrostatic waves created therein, thus enhancing density by collision-diffusion trapping of said ions to thereby enhance nuclear fusion reactions.

31. A method as recited in claim 30 wherein the step of directing includes providing an inner grid array (g1) having a radius (rg1), and an outer concentric grid array (g2) larger than and separated from the inner grid array by a radial spacing ($\delta r12$).

32. A method as recited in claim 31 including the step of providing a potential difference between said inner and outer grid arrays such that ions in the space between grid arrays g1 and g2 will be accelerated with nearly pure radial motion towards the system center at energies $E_i$ that are in the range $E_i \leq E_g$, resulting in an increase in ion density as the system center is approached more closely, where $E_g$ represents the ion maximum energy at the center.

33. A method as recited in claim 32 further comprising the step of decelerating said inward-moving ions, inside grid array g1, by converting ion kinetic energy of radial motion into electrostatic energy of repulsion due to the buildup of positive ion density at the system center, and into increasing kinetic energy of transverse (angular) motion with decreasing radial distance from the center, whereby a virtual anode is formed around the system center.

34. A method as recited in claim 33 further including the step of attracting electrons from the grid array g1 and from the space within g1, toward the system center, following said ions, said electrons tending to neutralize the buildup of repulsive positive charge of said ions near the system center, thus permitting the ions to continue their radial inward motion, with continuing increase in ion density.

35. A method as recited in claim 34 wherein the ratio of ion current to electron current in the region of the system center is controlled to fall in the range of 0.5 to 0.02.

36. A method as recited in claim 32 further including the step of selecting the initial density of ions of said plasma in the region between g1 and g2 such that the mean free path for electron/atom ionization collisions in this region, under the influence of the potential difference is $E_g$ is comparable to or less than the spacing between said inner and outer grid arrays.

37. A method as recited in claim 33 further including the step of ceasing radial inward motion of said ions at a momentum-convergence-limited radius $r_o$, given by $r_o \approx (E_t/E_w)^{0.5}$, where $E_t$ is the transverse energy of the ion at the position of grid array g1 and $E_w$ is the mean energy of the ions at the position of grid array (g1).

38. A method as recited in claim 36 further including the step of ceasing radial inward motion of said ions at a momentum-convergence-limited radius $r_o$, given by $r_o \approx (E_t/E_w)^{0.5}$, where $E_t$ is the transverse energy of the ion at the position of grid array g1, and $E_w$ is the energy of the ions at the position of grid array (g1).

39. A method as recited in claim 38 further including the step of applying a grid potential difference [$E_i$] $E_g \geq E_w$ and increasing ion density towards and within the central core near to and inside of $r_o$, by adjusting ion density within the region between the inner and outer grid arrays to sufficiently large values that the total current density in the core region within said inner grid array exceeds a critical value for the given ion energy such that the converging ion current will initiate and resonantly maintain ion acoustic waves those wavelength is small compared to the momentum-limited convergence radius, $r_o$, at a critical core radius $r_c$ comparable to $r_o$.

40. A method as recited in claim 31 further including the step of generating ion acoustic waves within the region interior to said critical core radius $r_c$ and tapping incoming ions within said critical core region by reflecting and scattering said ions from the boundaries of said ion acoustic waves, whereby said ions move diffusively through and within the said critical core region with mean free paths between such reflections and scatterings that are much smaller than the dimensions of said critical core region.

41. A method as recited in claim 40 wherein the step of generating ion acoustic waves includes injecting said ions with an injection power greater than 10-100 kw, with rg1 between 50-100 cm, with ion current recirculation ratios of 10-30, and with a potential difference between said inner and outer grid arrays between 10-400 keV.

42. A method as recited in claim 41 wherein injection power is in the range 100-500 kw with radius g1 at 40-80 cm, ion recirculation ratio of 10-20 and potential difference energy of 15-30 keV for use with DT fuels.

43. A method of enhancing nuclear fusion reactions comprising the steps of:
(a) generating a spherically symmetric electrostatic field in a spherical system having a center or a cylindrically symmetric electrostatic field in a cylindrical system having a central axis,
(b) producing a plasma of ions and electrons in said spherically symmetric or cylindrically symmetric electrostatic field for accelerating said ions in a radial direction toward the center of said spherical system or the central axis of said cylindrical system,
(c) accelerating said ions along said radial paths with a speed and flux density such as to produce ion acoustic waves at a core radius $r_c$ wherein the wavelength of said ion acoustic waves is less than $r_c$ and such that the ratio of change of the ion acoustic wavelengths with change in radial position of the ions is directly proportional to the ion radial position.

44. The method as recited in claim 43 wherein said accelerating step includes adjusting the ion density and ion flow such that the ion acoustic wavelength is at least approximately an integer divisor of the circumference of the sphere having said core radius $r_c$.

45. The method as recited in claim 44 maintaining said ion acoustic waves so as to cause collisional interactions of said ions with said ion acoustic waves, said collisional interactions occurring on the scale of said ion acoustic wavelength and within said core radius $r_c$, and
increasing the density of said ions within said core by injecting ions or a neutral gas within or near said core and by confining said ions utilizing said collisional interactions.

46. A method of enhancing nuclear fusion reactions comprising the steps of:
(a) generating a spherically symmetric electrostatic field in a spherical system having a center or a cylindrically symmetric electrostatic field in a cylindrical system having a central axis,
(b) producing a plasma of ions and electrons in said spherically symmetric or cylindrically symmetric electrostatic field for accelerating said ions in a radial direction toward the center of said spherical system or the central axis of said cylindrical system,
(c) accelerating ions along said radial paths such that their density within said core and their injection power are related such as to fall within the region 1000 of FIG. 7.

47. The method as recited in claim 46 wherein said accelerating step includes accelerating said ions such that their density and injection power are related such as to fall within the region 1000 of FIG. 7 excluding the region 1010.

48. The method as recited in claim 46 wherein $r_c$ is in the range of 0.1-2 cm, and $E_w$ is in the range of $10^4$-$10^5$ eV.

49. A method of enhancing nuclear fusion reactions comprising the steps of:
(a) generating a spherically symmetric electrostatic field in a spherical system having a center or a cylindrically symmetric electrostatic field in a cylindrical system having a central axis,
(b) producing a plasma of ions and electrons in said spherically symmetric or cylindrically symmetric electrostatic field for accelerating said ions in a radial direction toward the center of said spherical system or the central axis of said cylindrical system so as to circulate through a core region having a core radius, (c) accelerating ions along said radial paths such that their density within said core region and their injection power are related such as to satisfy the following two relationships:

$$n_c > (2\pi E_w/Z^2 e^2 r_c^2)(a_{ij}) \quad (1)$$

$$P_{inj} \geq 5.21E\text{-}3(a_{ij})(E_w^{2.5}/Z^2 G_j) \text{ (watts)} \quad (2)$$

wherein:
$n_c$ is the ion density at the core radius;
$E_w$ is the energy of the ions at the core radius;
$r_c$ is the critical radius at which ion-acoustic waves are generated;
$a_{ij}$ is 1 for ion/ion acoustic waves and $(m_c/m_i)^{0.5}$ for ion/electron acoustic waves wherein $m_c$ and $m_j$ are the mass of the electron and ion respectively;
$P_{inj}$ is the ion injection power;
$G_j$ is the electron recirculation ratio; and
Z is the ionic charge in units of electronic charge e.

50. Apparatus as recited in claim 1, wherein said enhancing means comprises means for injecting said ions into said core region so that ion injection power, $P_{inj}$ satisfies at least one of the following relationships:

$$P_{inj} \geq 5.21E\text{-}3(a_{inj})(E_w^{2.5}/Z^2 G_j) \text{ (watts)} \quad (1)$$

$$P_{inj} \geq 5.9E\text{-}3(a_{inj})(E_w^{2.5}/Z^2 G_j) \text{ (watts)} \quad (2)$$

wherein:
$E_w$ is the energy of the ions at the core radius;
$a_{ij}$ is 1 for ion/ion acoustic waves and $(m_c/m_i)^{0.5}$ for ion/electron acoustic waves wherein $m_c$ and $m_i$ are the mass of the electron and ion respectively;
$P_{inj}$ is the ion injection power; and
$G_j$ is the electron recirculation ratio.

51. Apparatus as recited in claim 50 wherein the density within the core radius satisfies the following relationship:

$$n_c > (2\pi E_w/Z^2 e^2 r_c^2)(a_{ij})$$

wherein:
$n_c$ is the ion density at the core radius;
$r_c$ is the critical radius at which ion-acoustic waves are generated; and
Z is the ionic charge in units of electronic charge e.

* * * * *